United States Patent [19]

Murakami et al.

[11] Patent Number: 5,155,852

[45] Date of Patent: Oct. 13, 1992

[54] DIGITAL INFORMATION CODING SYSTEM WHICH EVENLY DISTRIBUTES VALID INPUT DATA TO DIGITAL SIGNAL PROCESSORS OPERATING IN PARALLEL

[75] Inventors: Tokumichi Murakami; Koh Kamizawa; Naoto Kinjo, all of Kanagawa, Japan

[73] Assignee: Mitsubishi Denki Kabushiki Kaisha, Tokyo, Japan

[21] Appl. No.: 311,815

[22] Filed: Feb. 17, 1989

[30] Foreign Application Priority Data

| Feb. 19, 1988 | [JP] | Japan | 63-32921 |
| Mar. 18, 1988 | [JP] | Japan | 63-63695 |
| Nov. 26, 1988 | [JP] | Japan | 63-298722 |
| Nov. 26, 1988 | [JP] | Japan | 63-298723 |

[51] Int. Cl.⁵ .............................. G06F 12/00
[52] U.S. Cl. .................. 395/725; 364/246.3; 364/281.7; 364/230.3; 364/238.3; 364/DIG. 1; 395/575; 382/41
[58] Field of Search ............ 382/41, 48, 50, 57; 371/21.6, 25.1, 29.1, 54, 68.1, 71, 68.3; 395/725,575; 364/200 MS File, 900 MS File

[56] References Cited

U.S. PATENT DOCUMENTS

| 4,169,289 | 9/1979 | Shively | 364/900 |
| 4,202,035 | 5/1980 | Lane | 364/200 |
| 4,484,346 | 11/1984 | Sternberg | 382/41 |
| 4,484,349 | 11/1984 | McCubbrey | 382/41 |
| 4,531,200 | 7/1985 | Whitley | 364/900 |
| 4,594,687 | 6/1986 | Kaneko | 364/900 |
| 4,689,738 | 8/1987 | Van Wijk | 364/200 |
| 4,703,358 | 10/1987 | Flannaghan | 358/167 |
| 4,709,344 | 11/1987 | Crawford | 364/724.13 |
| 4,807,297 | 2/1989 | Hosoda | 358/160 |
| 4,862,260 | 8/1989 | Harradine | 358/160 |
| 4,862,270 | 8/1989 | Nishio | 358/160 |
| 4,935,867 | 6/1990 | Wang | 364/200 |
| 4,942,470 | 7/1990 | Nishitani | 358/160 |

OTHER PUBLICATIONS

"Computer Architecture for Signal Processing", Jonathan Allen, Proceedings of the IEEE, vol. 63, No. 4, Apr. 1975, pp. 624–633.

"Packing a Signal Processor onto a Single Digital Board", Louis Schirm IV, *Electronics*, Dec. 20, 1979, pp. 109–115.

"A 50NS Floating Point Signal Processor VLSI", Takao Kaneko et al., IEEE, 1986, pp. 401–404.

*Primary Examiner*—Thomas C. Lee
*Assistant Examiner*—Eric Coleman
*Attorney, Agent, or Firm*—Rothwell, Figg, Ernst & Kurz

[57] ABSTRACT

A digital signal processing apparatus which is used for the computation of coding image signals or the like and a motion compensative operation method which uses a digital signal processing apparatus. The apparatus comprises a plurality of signal processing means arranged in parallel and control means which assigns loads to the signal processing means so that the signal processing means have even computation volumes. Alternatively, an address generator is provided for each of data sets entered independently. An intermediate check is conducted during the computation for a block which involves a motion compensative operation.

2 Claims, 21 Drawing Sheets

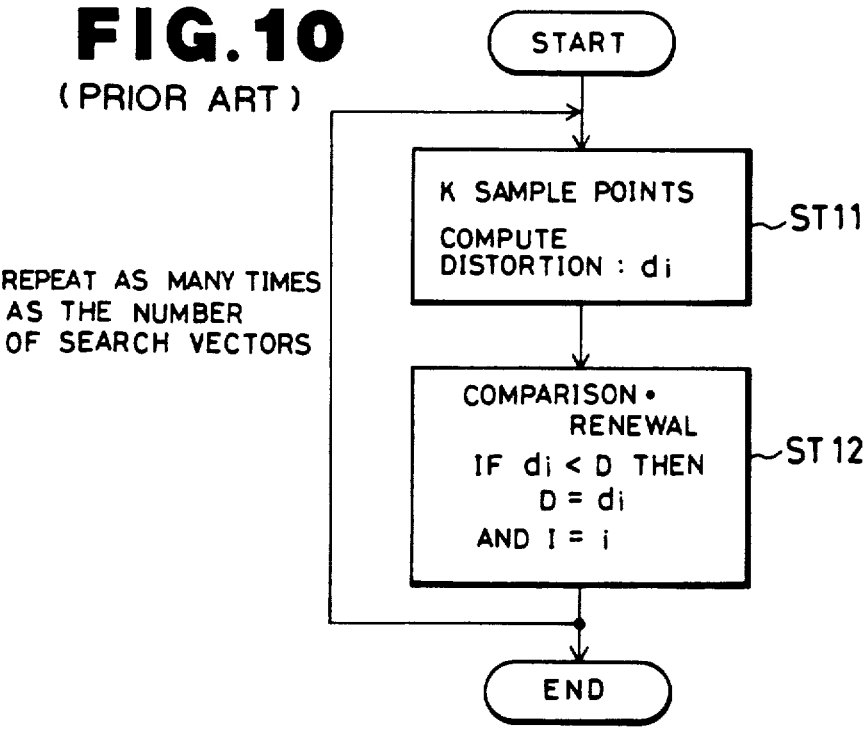
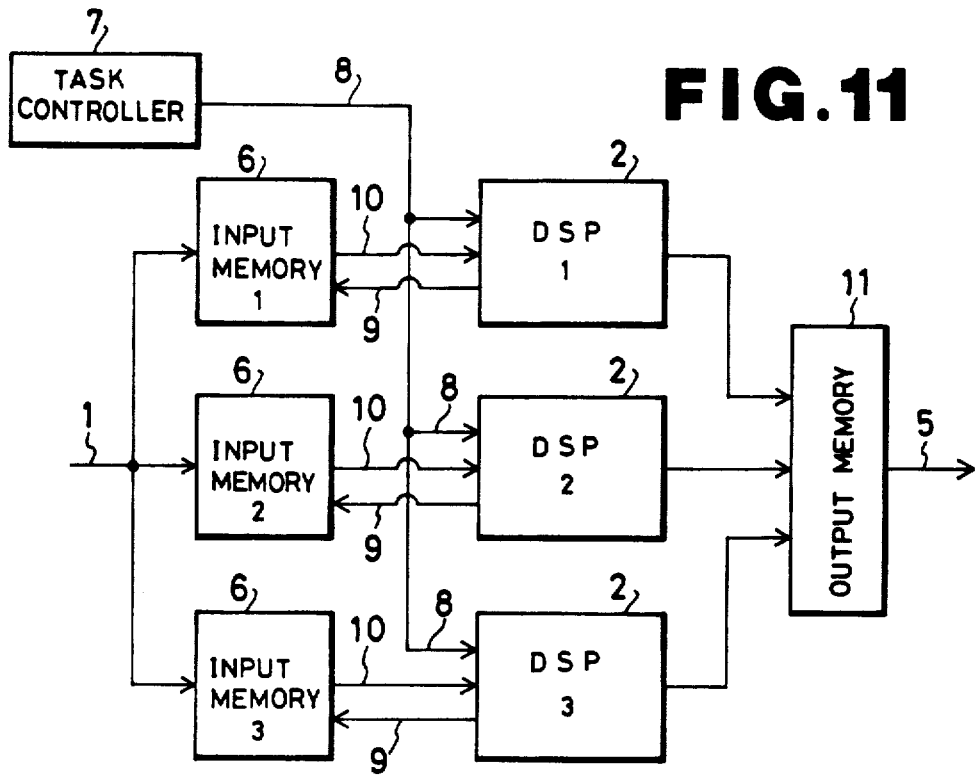

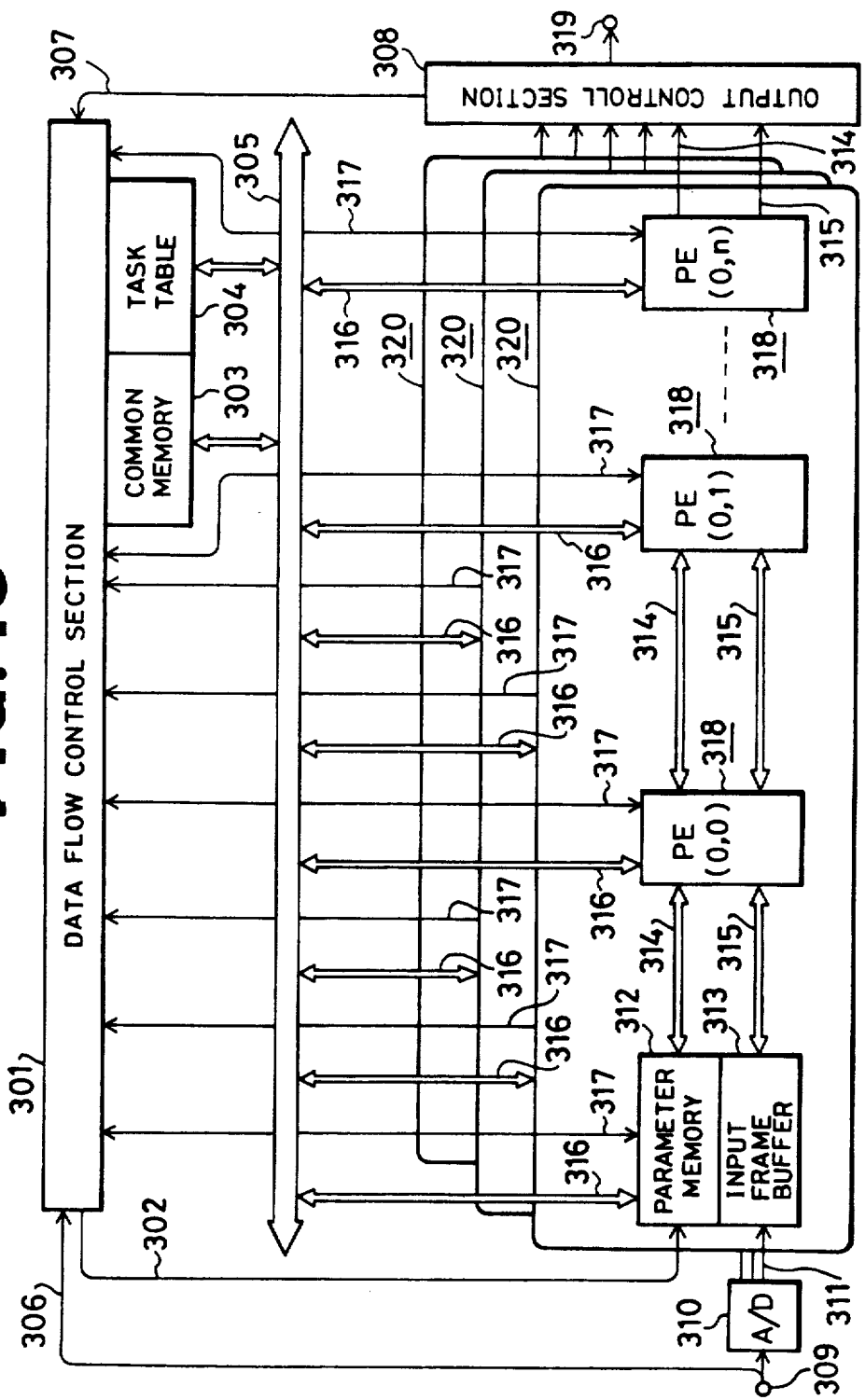

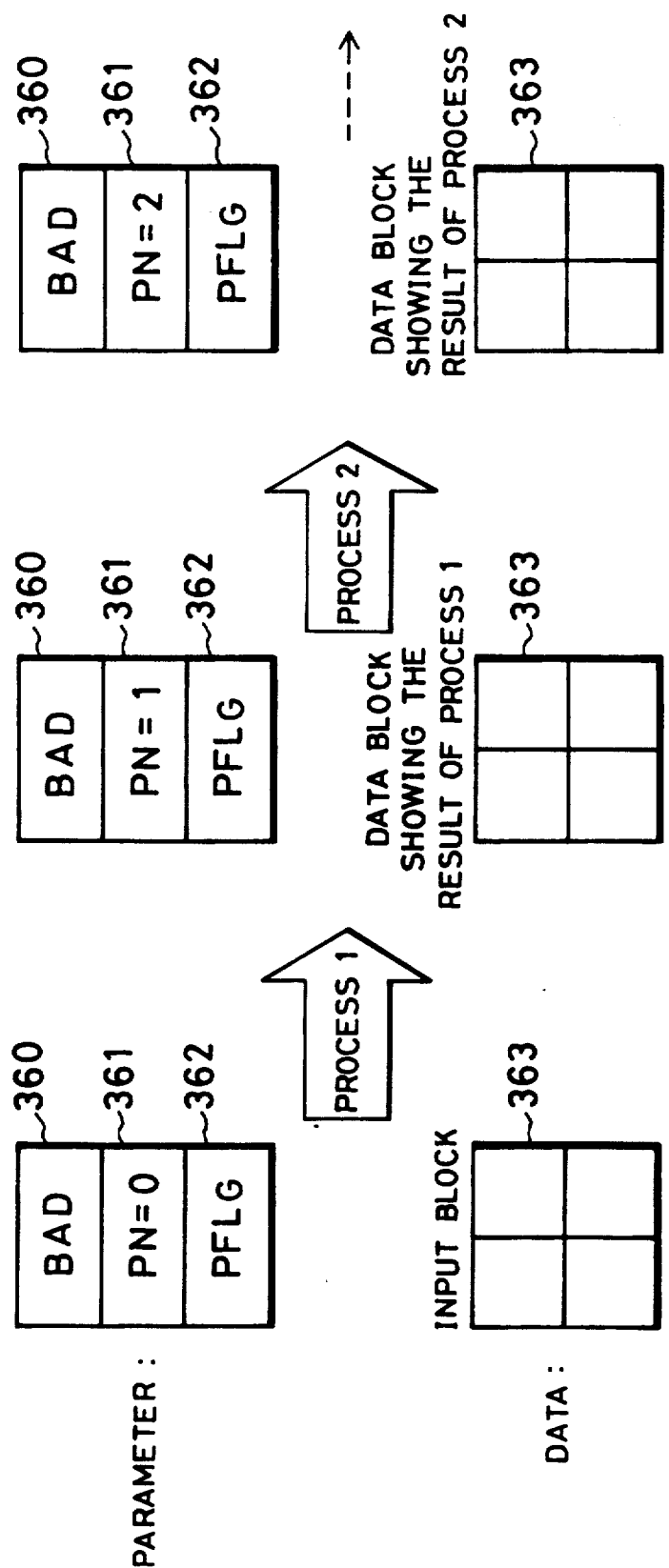

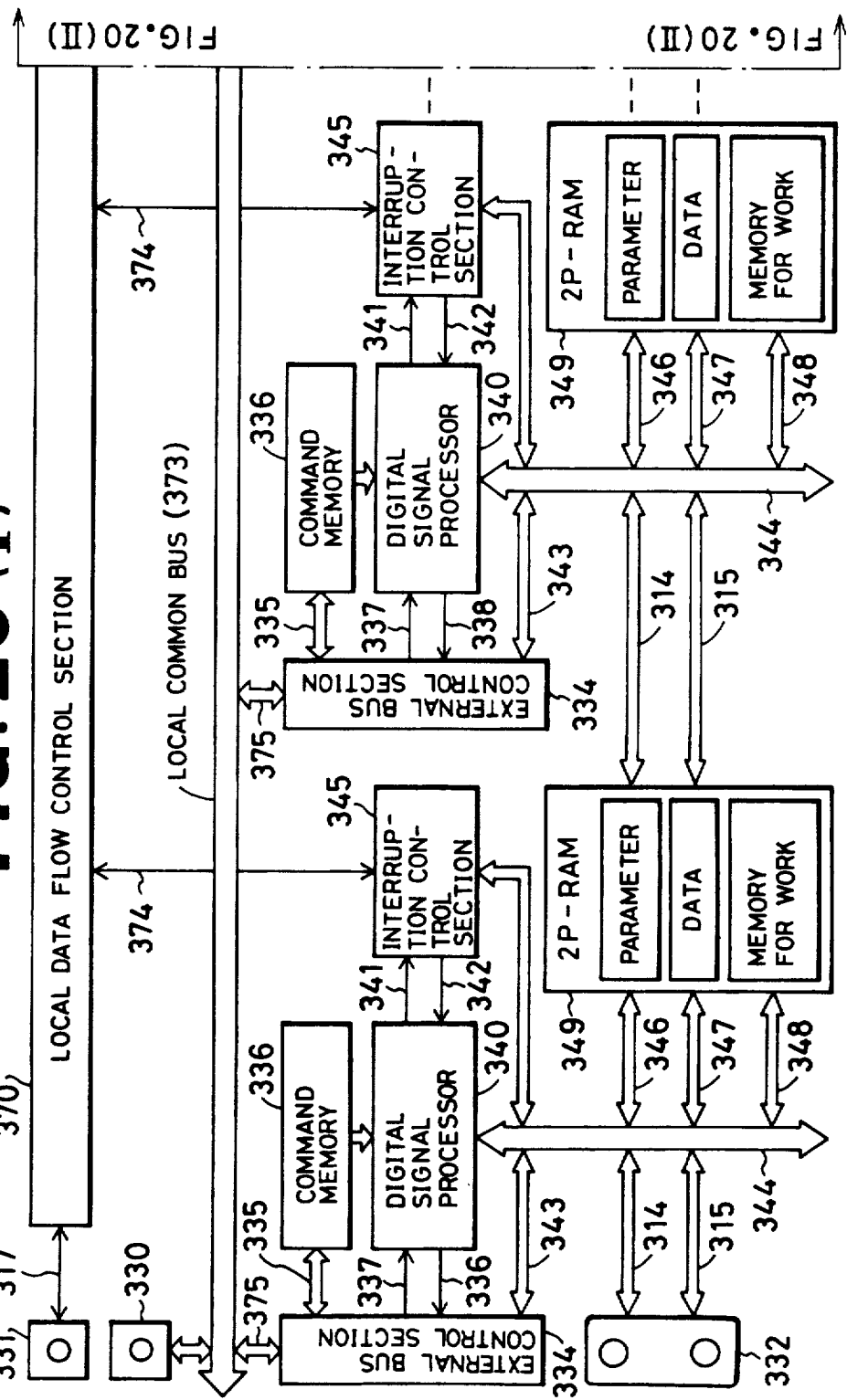

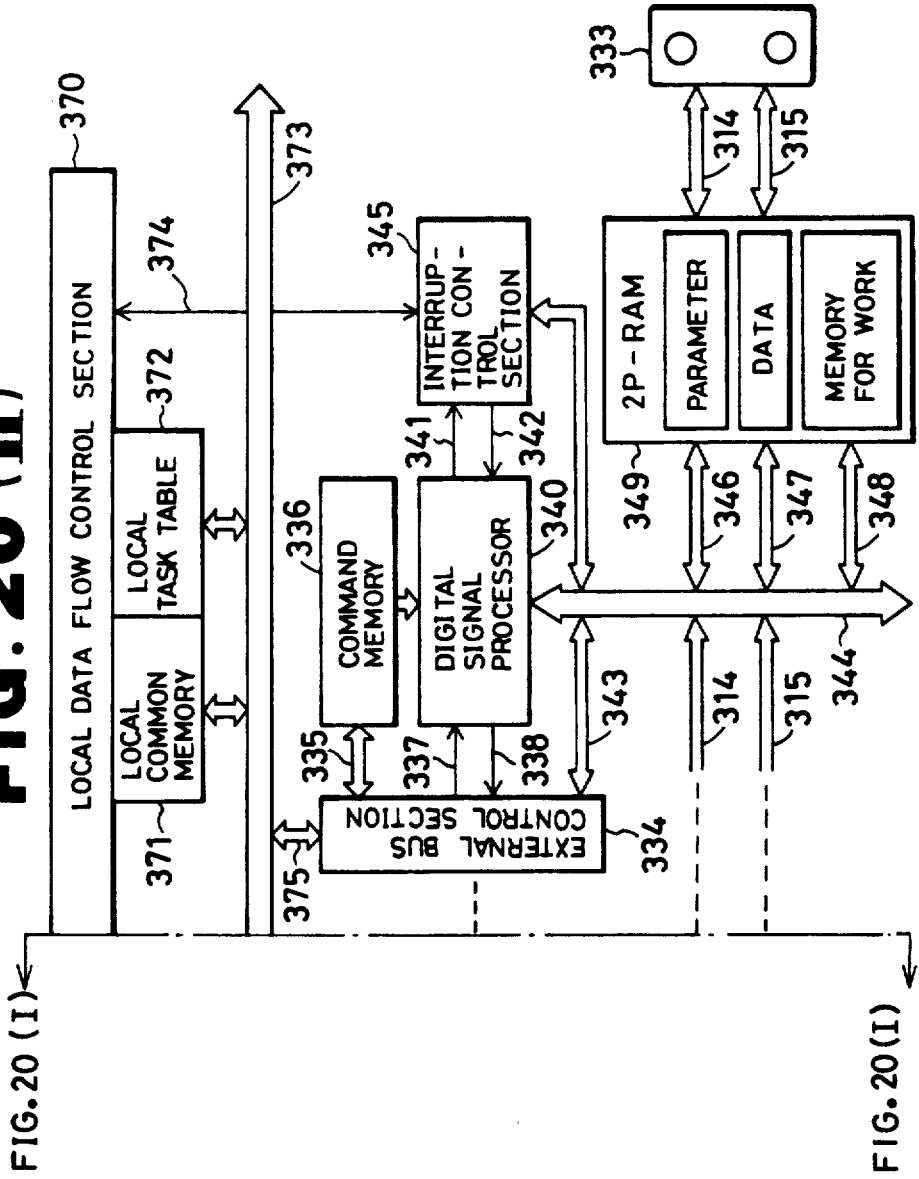
FIG. 20 (II)

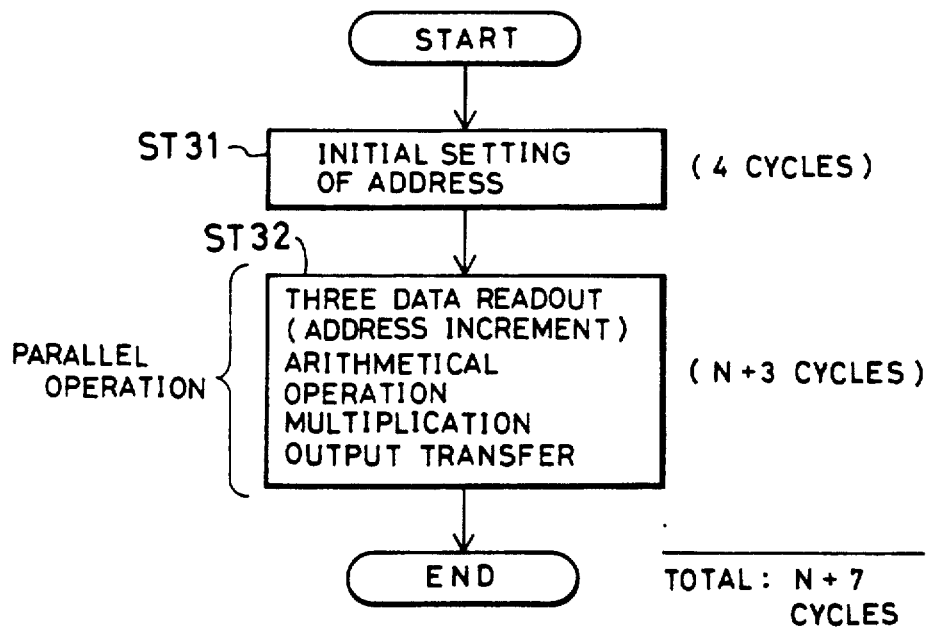
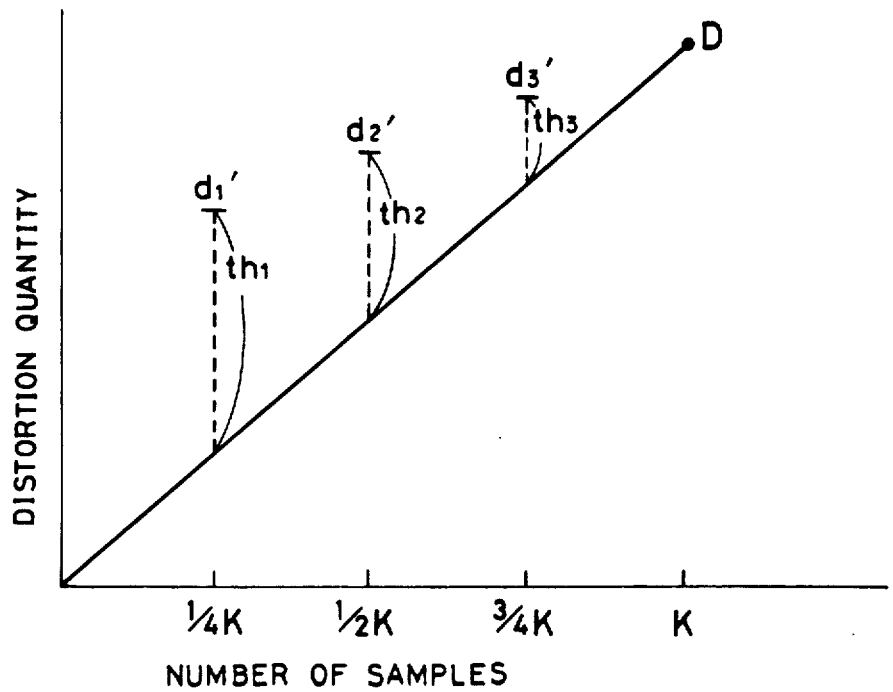

DIGITAL INFORMATION CODING SYSTEM WHICH EVENLY DISTRIBUTES VALID INPUT DATA TO DIGITAL SIGNAL PROCESSORS OPERATING IN PARALLEL

BACKGROUND OF THE INVENTION

1. Field of the Invention

The present invention relates to a digital signal processing apparatus which performs computational processes for digital signals 2. Description of the Prior Art FIG. 1 shows the multiprocessor system described in the article entitled "A Real Time Video Signal Processor Suitable for Motion Picture Coding Applications", IEEE, GLOBCOM '87, p. 453. In FIG. 1, input data 1 is received by a data transfer controller 3, and thereafter data 4 are transferred selectively to digital signal processors 2, i.e. DSP-1 through DSP-N, in block-1 After being processed by the respective DSPs in block-1, resultant data 5 is transferred to block-2 and processed by respective DSPs for the next processing step.

FIG. 2(a) shows divided memory areas of the DSPs. For the simplicity of explanation, shown here is an example of parallel processing using three DSPs 2, to which process areas A, B and C are assigned evenly.

In the inter-frame image coding system and the like, it is a general convention to employ the conditional pixel supplementary process in which only portions having at least a certain difference between the present input frame and the previous frame are coded and previous frame data is used for the remaining portions. Accordingly, the volume of computation needed for the process differs depending on the valid pixel rate even though the number of pixels in the process area is constant. The volume of computation or computation time needed is proportional to the valid pixel rate.

In the inter-frame image coding system or the like, assuming that the number of valid pixels is shared by all DSPs to have a distribution EA, EB and EC as shown in FIG. 2(b), the computation time needed for one block of parallel DSP configuration is determined from the process time of the DSP which processes data in the area B with the largest volume of process M, and the remaining DSPs which have finished processing the areas A and C earlier have idle time.

The conventional digital signal processing apparatus arranged as described above has its overall process time determined from the longest process time among DSPs when the density of information, such as the valid pixel rate, within a frame is uneven and the distribution of information varies with time, resulting in a degraded process efficiency per DSP unit.

FIG. 3 is a diagram showing, as an example, the arrangement of other digital signal processing apparatus disclosed in an article entitled "Realtime Video Signal Processor Module", in the proceeding of ICASSP '87, pp. 1961-1964, April 1987, Dallas, U.S.A. In the figure, indicated by 1 is an input terminal, 4 is an input bus for distributing input data from the input terminal 1, 28a is a feedback bus for distributing the result of previous processing, and 20 are signal processing modules each including an input storage unit 21, a processing unit 22, an output storage unit 23 and a timing control unit 24. Indicated by 25 are wired-OR circuits through which feedback data on output ports 30 are placed on the feedback bus 28a, 26 are wired-OR circuits through which output data on output ports 29 are delivered to an output terminal 5 over the output bus 5a, 27 are input ports for the input data to the signal processing module 20, and 28 are input ports for the feedback data to the signal processing modules 20.

FIG. 4 is a block diagram showing in more detail one of the signal processing modules in FIG. 3. In the figure, indicated by 221 is an address generator (AGU A), 211 is an input dual memory (MEM A) which receives data on the input port 27 over the input bus 4, 212 is an input dual memory (MEM B) which receives data on the feedback bus 28a by way of the input port 28, 222 is an address generator (AGU B), 223 is an X-bus, 224 is a Y-bus, and 225 is a pipeline arithmetic unit (PAU) having its input terminal EX1 connected to the X-bus 223 and another input terminal EX2 connected to the Y-bus 224. Indicated by 226 is a data memory [MEM P(Q)] having its output connected to the X-bus 223, 227 is an address generator [AGU P(Q)] having its output connected to the Y-bus 224 and data memory 226, 228 is a mode register (MDR) having its output connected to the X-bus 223 and Y-bus 224, and 241 is a Z-bus connected to the inputs of the address generators 221, 222 and 227, pipeline arithmetic unit 225 and data memory 226. Indicated by 242 is a sequencer (SEQ), 243 is an instruction memory (IRAM) connected to the output of the sequencer 242, and 245 is a decoder (DEC) connected to the output of the instruction memory 243, with the output of the decoder 245 being connected to the Z-bus 241 and output bus 231. The output bus 231 is connected to the input of the mode register 228 and the Z-bus 241. Indicated by 232 is a FIFO memory (MEM C) connected to the output bus 231, 233 is a FIFO memory (MEM D) connected to the output bus 231, 29 is an output port of the FIFO memory 232, and 30 is an output port of the FIFO memory 233.

FIG. 5 is a diagram showing, as an example, the system of a typical high-efficiency coder for a moving image. In the figure, indicated by 250 is an input terminal for the input video signal, 251 is an input frame buffer having at least a 1-frame capacity and having the simultaneous read-write ability, 252 is an inter-frame subtracter for evaluating the difference between adjacent frames, 253 is a block identifier, 254 is a coder, 255 is a coding parameter produced by the coder 254, 256 is a variable-length coder, 257 is a video multiplexer, 258 is a transmission buffer memory, and 259 is an output terminal for the coded data. Connected in cascade between the input terminal 250 and output terminal 259 are the above-mentioned functional blocks 251-254 and 256-258. Further indicated by 260 is a local decoder which receives the coding parameter 255, 261 is an inter frame adder, 262 is an in-loop filter, 263 is a coding frame memory, 264 is previously coded frame data, 265 is a motion compensator, 266 is current frame data fed from the input frame buffer 251 to the motion compensator 265, 267 is motion vector data, 268 is compensated previous frame data fed from the motion compensator 265 to the inter-frame subtracter 252 and inter-frame adder 261, 269 is a feedback signal, and 270 is a coding controller which provides coding control information 271 for the video multiplexer 257, a feed-forward signal 272 to the input frame buffer 251, a block identification control signal 273 to the block identifier 253, and a coding control signal 274 to the variable-length coder 256.

Next, the operation of the conventional digital signal processing apparatus will be described in connection with FIG. 3. This apparatus is intended for moving image processing and is based on the division parallel processing system in which a frame is divided into small frames and a signal processing module 20 is assigned to each of the divided frame areas.

Initially, each signal processing module 20 operates on the autonomous basis by requiring one video frame time to fetch a divided frame area assigned to it among the input data transferred frame-wise in raster scanning over the input bus 4 and to store the data in the input storage 21. At the same time, if the process result of the previous frame is needed for the current process, it operates by expending one video frame time to fetch data of the assigned area of the frame in the feedback data from the input port 28 over the feedback bus 28a and stores the data in the input storage 21.

Upon expiration of one video frame time, the processing unit 22 performs the prescribed signal processing for the input data and feedback data stored in the input storage 21, and stores the result temporarily in the output storage 23. The feedback data outfitted from the output storage 23 through the output port 30 is timed for synchronization with other signal processing modules 20 and, by being merged into all feedback data by the wired-OR circuit 25, placed on the feedback bus 28a. Similarly, the output data outputted from the output storage 23 through the output port 29 is timed for synchronization with other signal processing modules 20 and, by being merged into all output data by the wired-OR circuit 26, and delivered to the output terminal 5 over the output bus 5a.

Divided frame areas processed individually by the signal processing modules 20 are recombined into a video frame. Therefore, parallel processing of the divided areas type is realized. For the reasons as described above, it is necessary for all signal processing modules 20 to have their process commencement in complete synchronism with one another. On this account, the timing control unit 24 provides all sections of the system with the timing of data input/output and process commencement in synchronism with the video frame timing which is the synchronization reference point.

Next, the operation of one signal processing module 20 will be described in connection with FIG. 4. From a video frame entered frame-wise through the input port 27 in synchronism with the video frame sync signal, data of the assigned area is stored in the input dual memory 211. At the same time, among the coded previous frame data entered through the input port 28, the portion of the assigned area and its peripheral data are stored in the input dual memory 212.

The input dual memories 211 and 212 are made up of a two-sided memory device in the same structure on both sides and operate such that while one side is writing data, the other side is connected to the X-bus 223 and Y-bus 224 for reading by the pipeline arithmetic unit 225 to conduct a coding process. The read/write sides of the input dual memories 211 and 212 are switched by the above-mentioned video frame sync signal so that input data of assigned areas on the input ports 27 and 28 are entered frame-wise uninterruptedly.

The data read out to the X-bus 223 and Y-bus 224 are those stored at data memory addresses indicated to the input dual memories 211 and 212 by the address generators 221 and 222 that are controlled by the signals provided by the decoder 245 by decoding an 80-bit length horizon-type microcode read out in accordance with the address of the command memory 243 indicated by the sequencer 242. The data placed on the X-bus 223 and Y-bus 224 are entered in parallel to the pipeline arithmetic unit 225, which implements a series of signal processing steps including coding and local decoding and outputs the result to the Z-bus 241. Among the process outputs placed on the Z-bus, the coded output is stored in the FIFO memory 232 and the local decoded output is stored in the FIFO memory 233 by way of the output bus 231.

The FIFO memories 232 and 233 are buffer memories of FIFO configuration. Feedback data consisting of the output data and local decoded data are read out of the output ports 29 and 30 at the read control timing for the assigned area produced from the video frame signal, and an amount of video frame local decoded data and coded output data in compliance with the scanning order are produced.

The data memory 226 which is controlled by the output of the address generator 227 is used as a work memory which is necessary for the processing by the pipeline arithmetic unit 225 and a table which stores constants. The mode register 228 consists of a register file including registers for loading immediate values from the decoder 245.

This digital signal processing apparatus is principally based on the foregoing area division parallel processing, and is intended such that each signal processing module 20 deals with a divided frame area independently on a realtime basis. When the digital signal processing apparatus is intended for the achievement of a coder as shown in FIG. 5, only portions excluding the variable-length coder 256, video multiplexer 257, transmission buffer 258 and coding controller 270 can be realized. Namely, it is not suitable for a continuous process in one video frame, and is limited to the inter-frame coding loop process ranging from the input frame buffer 251 to the block identifier 253, coder 254, local decoder 260, coding frame memory 263, and to the motion compensator 265 useful for data completely divisible within a frame.

Since each signal processing module 20 implements the same process for each frame, the processing program stored in each instruction memory 243 can be a single program. When a frame is divided into M areas (M is an integer greater than or equal to 1), the number of process cycles Nc per pixel which can be dealt with on a realtime basis by one signal processing module 20 is given by the following calculation.

$$Nc = Mc \cdot Tf/Mp \cdot Np \text{ (clocks/pixel)}$$

where Mc is the frequency of machine cycle (Hz), Tf is the frame period (sec), Mp is the number of horizontal pixels in the assigned area, and Np is the number of vertical pixels in the assigned area.

On this account, if a frame is divided into four areas, for example, each having the assignment of a signal processing module 20, the number of process cycles Nc is increased by four fold, and it becomes possible for the video signal processing, which is required to be very fast, to be dealt with on a realtime basis by an increased number of relatively slow signal processing modules 20.

The conventional digital signal processing apparatus arranged as described above have the following problems for processing video signals.

(a) For the achievement of very fast processing, a frame must be divided into numerous small areas, however, certain signal process system configurations do not allow independent processes for areas below a certain minimal division size. Therefore, realtime processing can not be achieved by increasing the parallelism.

(b) Because of a fixed distribution of load to signal processing modules, the process time must be set to meet the longest one when each signal processing module has a different process time. Therefore, the system has an unnecessarily increased parallelism relative to the processing capacity.

(c) Data input and data processing each take one frame time, and data input and output each need a 1-frame buffer memory, resulting in a longer time lag and an increased memory capacity. Therefore, the system involves a significant loop delay in feedback control and the like, and it is difficult to realize the coding controller 270 in FIG. 5 for example.

(d) Since the system is intended for a complete parallel processing, it cannot perform such a process as scanning the entirety of a frame horizontally.

FIG. 6 is a block diagram of the conventional digital signal processing system disclosed in the proceeding (No. S10-1) of the 1986 annual convention of the communication department of The Institute of Electronics and Communication Engineers of Japan. In the figure, indicated by 31 is a dual-port internal data memory (will be termed 2P-RAM) capable of reading and writing two sets of data simultaneously, 32 is an address generator which calculates the address of read data or write data, 33 is a data bus used for the internal transfer of data related to computation, 34 and 35 are selectors which select data in the 2P-RAM 31, 36 is a register which holds computation data selected by the selector 34, 35 is a register which holds computation data selected by the selector 35, 38 is a multiplier, 39 is a register which holds the output of the multiplier 38, 40 is a selector which selects the output of the register 36 or accumulators (ACC0–ACC3) 44, 41 is a selector which selects the output of the registers 39 or 37, 42 is an arithmetic/logic unit which performs computations for the outputs of the selectors 40 and 41, and 43 is a selector which selects the output of the arithmetic/logic unit 42 or data in an external data register 46. The accumulators 44 are used to hold the output of the arithmetic/logic unit 42 for cumulative computations. The external data register 46 holds data from an external data memory 47. Indicated by 45 is an external address register which holds address data provided by the address generator 32 and transfers it to the external data memory 47.

Next, the operation will be described. This signal processing system based on a digital signal processor performs command fetching and decoding for the preset microprogram, data reading, computation, and computation result writing, in a parallel pipeline processing mode. The following describes the operation of 3-input-1-output computation.

The arithmetic/logic unit, multiplier, address generator, data memories and selectors are controlled in the microcommand mode.

Arithmetic operations for two inputs, including addition, subtraction, maximum evaluation, minimum evaluation, etc. are expressed generically by $a \oplus b$, and a multiplication operation for two inputs is expressed generically by $a \times b$, where a and b are independent data.

The arithmetic operations and multiplication are combined to form 3-input-1-output operations, and they are defined by the following expressions.

$$Z_i^1 = (a_i \oplus b_i) \times c_i \quad (1)$$

$$Z_i^2 = (a_i \times b_i) \oplus c_i \quad (2)$$

where $i = 1$ to $N$, and $a_i$, $b_i$ and $c_i$ are sets of independent data stored in the 2P-RAM 31.

FIG. 7 shows the sequence of process steps for implementing the 3-input operation of the form of expression (1) by the digital signal processing system, for example, shown in FIG. 6.

The data address generator 32 sets up the starting addresses for two data sets A and B, and selects the simple incremental mode. Then the two data sets A and B are loaded through the selectors 34 and 35 into the registers 36 and 37. The selectors 40 and 41 select the registers 36 and 37, respectively, so that the arithmetic/logic unit 42 implements the arithmetic operation $a_i \oplus b_i$. The selector 43 selects the arithmetic/logic unit 42 to hold the operation result temporarily in one of accumulators (ACC0–ACC3) 44, and the resultant data is sent over the data bus 33 and through the external register 46 and stored in the external memory 47, which addressing mode is the simple incremental mode by being linked to one of the addresses for the 2P-RAM 31 in the address generator 32.

In the subsequent step ST3, the data address generator 32 sets up the starting addresses of the data set C and data set $a_i \oplus b_i$, and ci data is read out of the 2P-RAM 31 to the register 36. The selector 35 selects the data bus 33 to load the data of $a_i \oplus b_i$ from the external memory 47 into the register 37. In this case, in order to have a coincident timing of reading for the data set C and data set $a_i \oplus b_i$, step ST4 needs to expend two cycles of useless command reading for the external memory in advance.

The two sets of data are multiplexed by the multiplier 38 in step ST5, and the result is stored in the register 39. In the next cycle, the resultant data is passed through the arithmetic/logic unit 42 and, after being held temporarily in one of the accumulators (ACC0–ACC3) 44, transferred over the data bus 33 to the 2P-RAM 31.

These operations are carried out in parallel on the basis of the pipeline process, and the operations from the reading of 2P-RAM 31 until the storing of the process result in the external memory 47 for N data sets will take $N+3$ machine cycles in the case of an arithmetic operation.

The steps of operations are listed in the following Table 1 and Table 2. Table 1 lists for the operation of $a_i \oplus b_i$ and the transfer of the result to the external memory 47, and Table 2 lists the reading of the resultant $a_i \oplus b_i$ from the external memory 47, the operation of $(a_i \oplus b_i) \cdot c_i$, and the transfer of the result to the 2P-RAM. In both tables, symbol "x" represents an indefinite value. Storing in the external data register 46 completed in machine cycle $N+3$ in both tables, and the external data register 46 is read uselessly in machine cycle 0 (two machine cycles) in Table 2.

TABLE 1

| Machine cycle | Register 36 | Register 37 | Register 39 | accx | External data register 46 |
|---|---|---|---|---|---|
| 1 | $a_1$ | $b_1$ | x | x | x |
| 2 | $a_2$ | $b_2$ | $a_1 \times b_1$ | $a_1 \oplus b_1$ | x |
| 3 | $a_3$ | $b_3$ | $a_2 \times b_2$ | $a_2 \oplus b_2$ | $a_1 \oplus b_1$ |
| 4 | $a_4$ | $b_4$ | $a_3 \times b_3$ | $a_3 \oplus b_3$ | $a_2 \oplus b_2$ |
| . | . | . | . | . | . |
| . | . | . | . | . | . |
| . | . | . | . | . | . |
| N | $a_N$ | $b_N$ | $a_{N-1} \times b_{N-1}$ | $a_{N-1} \oplus b_{N-1}$ | $a_{N-1} \oplus b_{N-2}$ |
| N + 1 | x | x | $a_N \times b_N$ | $a_N \oplus b_N$ | $a_{N-1} \oplus b_{N-1}$ |
| N + 2 | x | x | x | x | $a_N \oplus b_N$ |
| N + 3 | x | x | x | x | x |

TABLE 2

| Machine cycle | Register 36 | Register 37 | Register 39 | a c c x | External data register 46 |
|---|---|---|---|---|---|
| 0 | x | x | x | x | $a_1 \oplus b_1$ |
| 1 | $a_1 \oplus b_1$ | $c_1$ | x | ↘ | $a_2 \oplus b_2$ |
| 2 | $a_2 \oplus b_2$ | $c_2$ | $(a_1 \oplus b_1) \times c_1$ | ↘ | $a_3 \oplus b_3$ |
| 3 | $a_3 \oplus b_3$ | $c_3$ | $(a_2 \oplus b_2) \times c_2$ | ↘ | $a_4 \oplus b_4$ |
| . | . | . | . | ↘ | . |
| . | . | . | . |   | . |
| . | . | . | . |   | . |
| N | $a_N \oplus b_N$ | $c_N$ | $(a_{N-1} \oplus b_{N-1}) \times c_{N-1}$ |   | x |
| N + 1 | x | x | $(a_N \oplus b_N) \times c_N$ | ↘ | x |
| N + 2 | x | x | x | ↘ | x |
| N + 3 | x | x | x | x | x |

Next, after two useless reading cycles of the external memory 47 for timing purposes, multiplication is carried out for N data sets and the results are stored in the 2P-RAM 31. These operations take N+3 machine cycles, which are increased by two command cycles for address initialization, and a total of 2N+10 cycles are expended. An operation of expression (2) also takes 2N+10 cycles. Accordingly, it will be appreciated that if a 3-input-1-output operation is conducted for N data sets using a processor with the ability of 2-input operation at most, it will take about 2N machine cycles (provided that N is sufficiently large).

The following describes the cumulative operation for the results of the foregoing 3-input-1-output computation.

$$S = \sum_{i=1}^{N} (a_i \oplus b_i) \times c_i \quad (3)$$

$$S = \sum_{i=1}^{N} (a_i \times b_i) \oplus c_i \quad (4)$$

In the case of expression (3), the multiplication result for $a_i \oplus b_i$ and $c_i$ (output of register 39) and the intermediate cumulative value are entered to the arithmetic/logic unit 42, and the result of summation is entered back to the same accumulator 44 through the selector 43. Thereby, the process takes 2N+10 cycles unchanged.

In the case of expression (4), the data sets ($a_i \times b_i$)⊕$c_i$ which have been stored temporarily in the 2P-RAM 31 are read out sequentially and summed by the arithmetic/logic unit 42, and therefore the process needs another N cycles, resulting in a total of 3N+10 cycles.

The conventional digital signal processing system is formed as described above, and therefore for a 3-input-1-output operation of three independent data sets, it performs two 2-input-1-output operations. In addition, the process time is further extended for address control, memory transfer and other processes.

FIG. 8 is a diagram showing in brief the image coding transmitter which implements the conventional motion compensatory operation method disclosed in an article entitled "Dynamic Multistage Vector Quantization for Images", journal of The Institute of Electronics and Communication Engineers of Japan, Vol. J68-B, No. 1, pp. 68-76, Jan. 1985. In the figure, indicated by 51 is an input signal of image data formed of a plurality of consecutive frames on the time axis, 52 is a motion compensator which produces a prediction signal on the basis of the resemblance computation of correlation between the current frame represented by the input signal 51 and the previous frame represented by a previous frame signal 53 which is the previous reduced signal 51, 54 is motion vector information provided by the motion compensator 52 indicative of the position of a prediction signal block, 55 is a prediction signal produced by the motion compensator 52, 56 is a coder which codes the difference between the input signal 51 and the prediction signal 56 to form a coded difference signal, 57 is a decoder which decodes the signal coded by the coder 56, and 58 is a frame memory which stores data reproduced through the summation of the difference signal from the decoder 57 and the prediction signal from the motion compensator 52.

The performance of the foregoing arrangement will be described in connection with FIG. 9. The motion compensation process calculates for the input signal 51 the amount of distortion between an 11-by-12 block located in a specific position in the current frame shown in FIG. 9(A) and M blocks in the search range S in the previous frame shown in FIG. 9(B) to evaluate the position of the block y providing a minimal distortion relative to the position of the input block, i.e., motion vector V, and to recognize the signal of the minimal distortion vector block as a prediction signal.

The number of motion vectors V under search within the search range S in the given frame is assumed to be M (an integer greater than 1). The amount of distortion of the position of a specific motion vector V between the previous frame blocks and the current input block is calculated as a sum of absolute values of differences as follows.

$$di = \sum_{h=1}^{K} |yih - xh| \qquad (5)$$

where input vectors $x = \{x1, x2, \ldots, xk\}$, search object blocks $yi = \{yi1, yi2, \ldots, yik\}$, $i = 1, 2, \ldots, M$, and M and K are fixed values. The motion vector V is evaluated as follows.

$$V = Vi\{min\ di | i = 1, 2, \ldots, M\} \qquad (6)$$

FIG. 10 shows the sequence of operations for detecting the motion vector V. Step ST11 calculates a distortion di at each of K sampling points on the basis of expression (5), and the next step ST12 compares the di with the minimal distortion D at position I, and, if $di < D$, the variables are replaced to be $D = di$ and $I = i$. These operations are repeated for the number of search vectors, i.e., the operational process of expression (6), to determine the final minimal distortion D and its position I.

These operations must be completed within the period of each frame entered successively, and therefore a high-speed digital signal processor is required.

As an example, the digital signal processing system shown in FIG. 6 is used to carry out the motion compensation process. In this case, the multiplication-sum operation takes place $K \times M$ times for each input block, and the number of machine cycles is the total time expended by M times of processes including comparison and updating. Generally, the number of cycles for comparison and updating is small enough as compared with that of the multiplication-sum operation, and the volume of motion compensation operation for one block is virtually equal to $K \times M$ machine cycles.

However, since these operations are determined from the time corresponding to the period of frames entered successively, parallel processing will be needed for the mass multiplication-sum operations to be performed in a short time, depending on the operation process cycle time of a particular digital signal processor.

The conventional motion compensation scheme is implemented as described above, and in order to ensure the operation time for an enormous volume of operations when carried out using a digital signal processor, the processor needs to have parallel processings, resulting in an increased complexity and scale of hardware structure.

SUMMARY OF THE INVENTION

The present invention is intended to overcome the foregoing prior art deficiencies, and a prime object therefore is to provide a digital signal processing apparatus which uses the multiprocessor parallel configuration to its maximal processing ability.

Another object of this invention is to provide a digital signal processing apparatus which works efficiently with a less number of processors and less memory capacity while ensuring the latitude of signal processing algorisms.

Still another object of this invention is to provide a digital signal processing apparatus which eliminates the need for address control for storing the intermediate result and transfer to the memory, thereby executing fast 3-input-1-output operation.

A further object of this invention is to provide a motion compensative operation method which, in constructing the motion compensator of an image coding system with a digital signal processing apparatus, requires a less number of parallel processors, thereby enhancing the simplicity and compactness of the hardware structure.

In order to achieve the above objectives, the inventive digital signal processing apparatus comprises a plurality of processors and a task controller which issues address control signals of task assignments to the processors so that they fetch an even quantity of significant information to their memories for processing.

Furthermore, the inventive digital signal processing apparatus comprises a plurality of signal processors connected with one another through a dual-port memory arranged in series and/or parallel, a shared memory which can be accessed for reading and writing in blocks of signal processing or in arbitrary number of data from all of the signal processors, a task table which stores the process status in the signal processors, and a data flow controller which scans the contents of the task table at a certain interval, determines a charged process of each signal processor on the basis of feedback data including the occupancy rate of buffer memory reported by the output controller, and directs the interrupt controller of each signal processor to start.

Furthermore, the inventive digital signal processing apparatus comprises first through third data reading address generators adapted to read three independent data sets independently and simultaneously, and a pair of arithmetic units and multipliers adapted to execute a 3-input-1-output arithmetic operation at high speed by each receiving the output of its counterpart mutually.

The inventive motion compensation method using a digital signal processing apparatus divides a current input frame of digital image data, which consists of a plurality of frames, entered successively into a plurality of blocks, searches the previous input frame for a pattern which resembles one block of the input frame, and implements a coding process with a block of minimal distortion in highest resemblance as a prediction signal, wherein in detecting a block of minimal distortion through the computation of inter-pattern resemblance using the difference and accumulation of pixels in each block between the block of the current input frame and M blocks (M is a positive integer) in the previous input frame, the method uses, for the pattern resemblance computation, a maximum of K pixels (K is an integer greater than 0 and less than or equal to a total number of pixels in a block), implements an intermediate check n times (n is an integer greater than 0) during the computation of resemblance at time points when the number of reference pixels is smaller than K, skips the computation for remaining pixels when a cumulative value at each intermediate check time point is greater than a threshold value which is set for each intermediate check time point of and excludes the block from the range of comparison for finding a minimal distortion block, and detects by computation the minimal distortion block among blocks in which cumulative values are below the thresholds at all time points of intermediate check.

DESCRIPTION OF THE DRAWINGS

FIG. 10 is a flowchart showing the operational process for detecting a motion vector in the conventional motion compensative operation method;

FIG. 11 is a block diagram showing the digital signal processing apparatus based on the first embodiment of this invention;

FIG. 15 is a block diagram showing the digital signal processing apparatus based on the second embodiment of this invention;

FIG. 18 is a diagram explaining the relation between parameter data and processing block data in the digital signal processing apparatus shown in FIG. 15;

FIG. 20(a) and 20(b) are block diagram of the arrangement in which a plurality of digital signal processors are included in the digital signal processing apparatus shown in FIG. 15;

FIG. 22 is a flowchart showing the operational process of the digital signal processing apparatus shown in FIG. 21;

FIG. 24 is a diagram used to explain the method of intermediate check for the computation of distortion in the inventive motion compensative operation method.

DETAILED DESCRIPTION OF THE PREFERRED EMBODIMENTS

Figure 1:
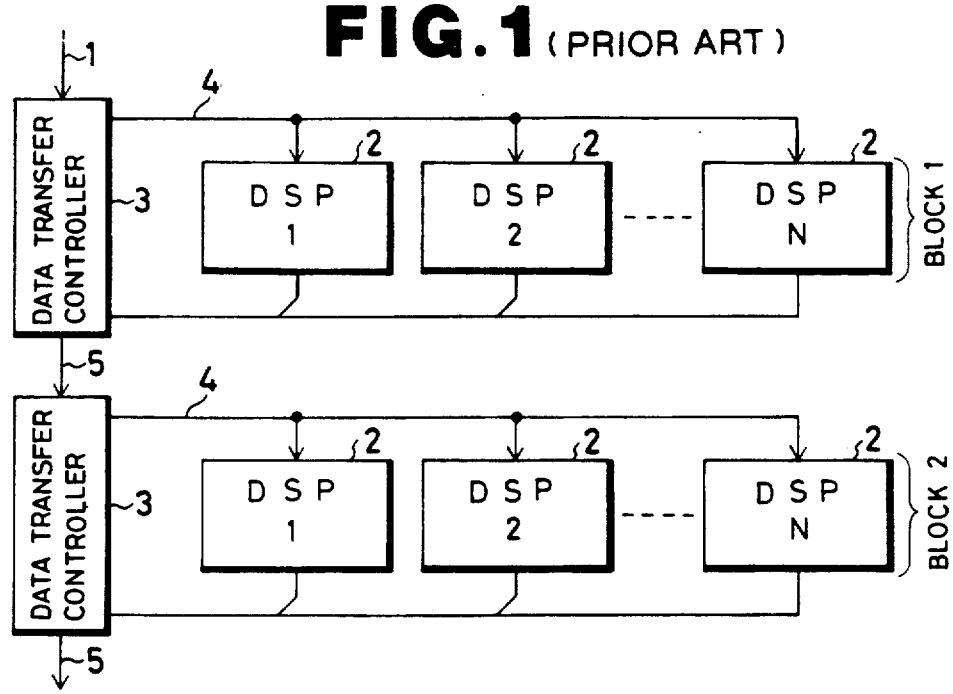
FIG. 1 is a block diagram showing the multiprocessor system of a conventional digital signal processing apparatus.
Figure 2:
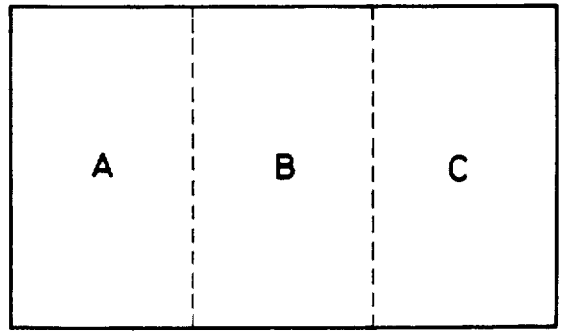
FIGS. 2(a) and 2(b) are diagrams explaining the assigned areas of the processors shown in FIG. 1.
Figure 2:
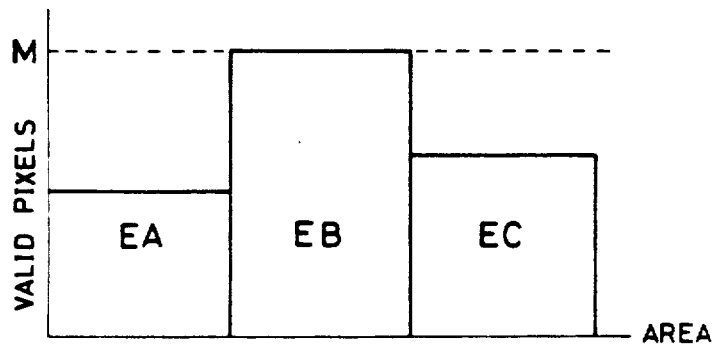
Figure 3:
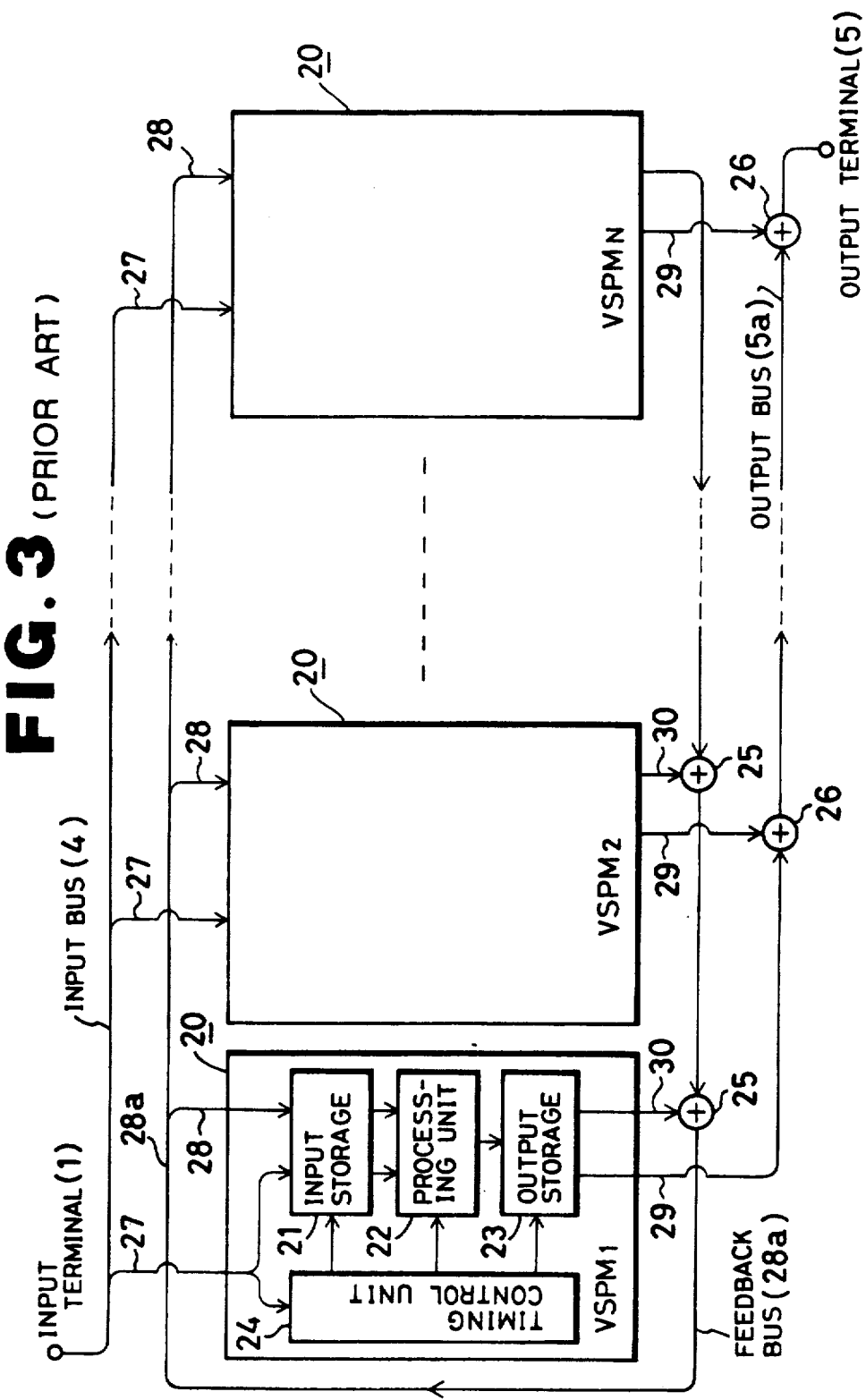
FIG. 3 is a block diagram showing the arrangement of other conventional digital signal processing apparatus.
Figure 4:
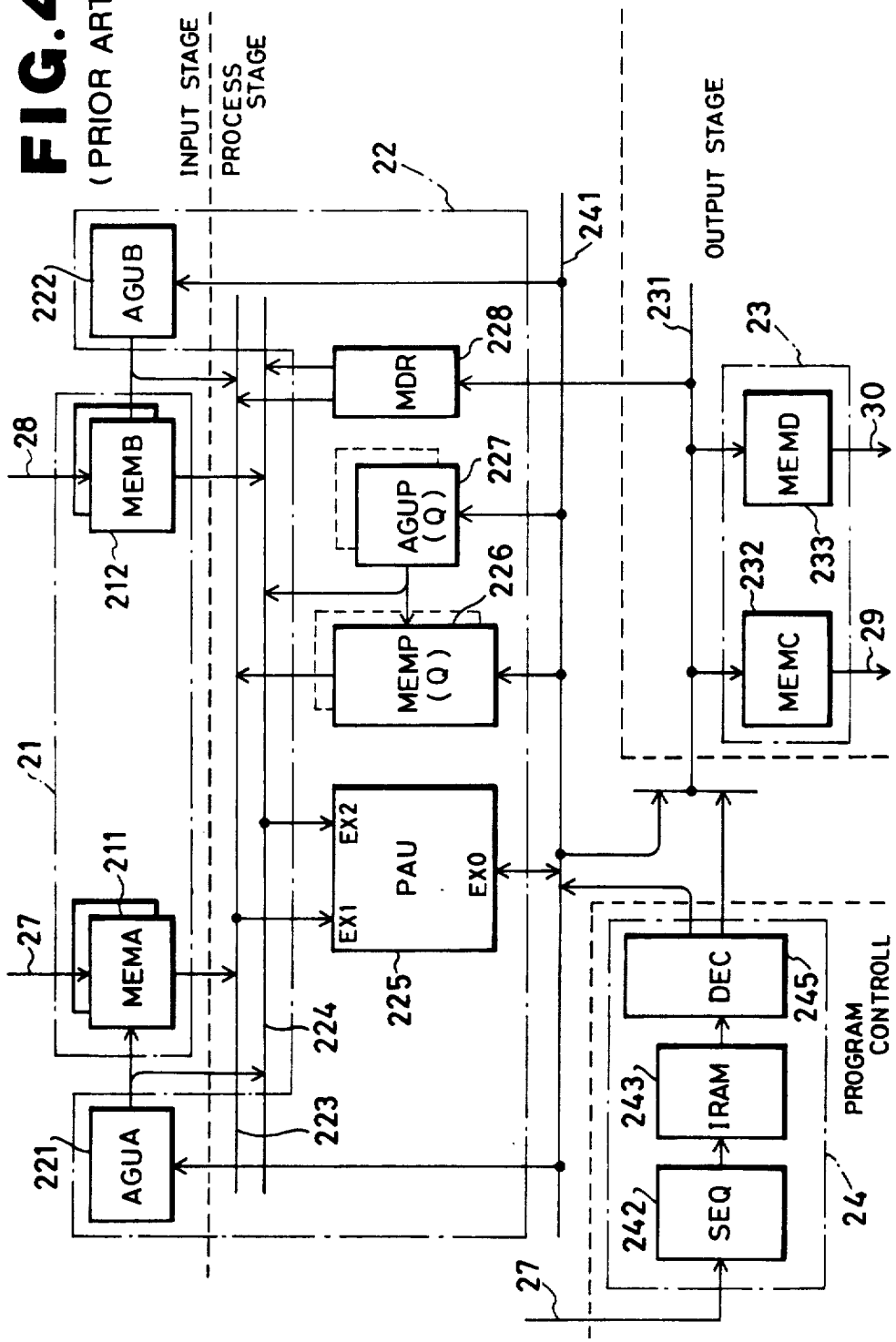
FIG. 4 is a block diagram showing in detail the arrangement of the signal processing module shown in FIG. 3.

Specific embodiments of the present invention will now be described with reference to the drawings.

FIG. 11 shows, as an embodiment of this invention, an example of an image coder of the digital signal processing apparatus. In the figure, input data 1 is entered to first through third input memories 6. A task controller 7 estimates the number of valid pixels on the basis of the contents of the input memory 6, determines the distribution of coding processing among a first, second and third DSP 2, and issues control signals as address control signals 8 to the DSPs 2. Upon receiving the address control signals 8, the first, second, and third DSPs 2 issue addresses 9 to respective first, second and third input memories 6 to fetch data 10 assigned for processing, and implement the coding processes based on the preset program. Upon completion of processes, the first, second and third DSPs 2 store processed data in an output memory 11, which, after reading the whole data of the DSP block, sends the processed data to the next DSP block.

Figure 12A:
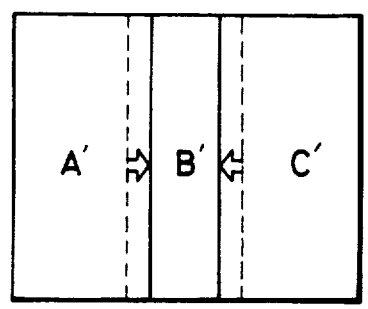
FIGS. 12(a) and 12(b) are diagrams explaining the area assignment for the processors shown in FIG. 11.
Figure 12B:
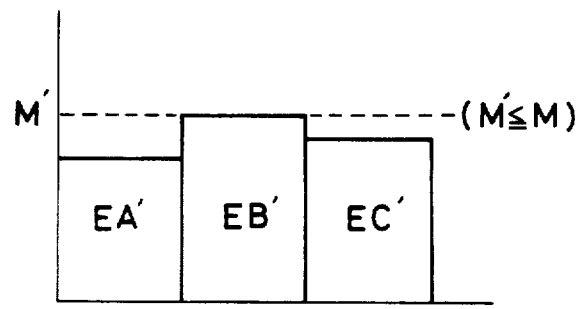

In this case, each DSP 2 is controlled by the task controller 7 so that all DSPs 2 have even numbers of valid pixels assigned, and therefore the image coding process time is controlled so that the difference of process times among the DSPs 2 is minimal. Namely, in case of coding an image with numbers of valid pixels as shown in FIG. 12(b), an area A having a relatively small number of valid pixels is enlarged to A', an area C having a relatively large number of valid pixels is also enlarged to C', and an area B having a larger number of valid pixels is reduced to B', as shown in FIG. 12(a), by the task controller 7. The task controller 7 issues the address control signals 8 corresponding to the assignment distribution to the first, second and third DSPs 2.

For example, in response to the issuance of the address control signal 8 for coding the image data of area A to the first DSP 2, it produces the address 9 for the area A' in the first input memory 6 to fetch data and implements the image coding process by following the prescribed program. Similarly, the second and third DSPs 2 are directed to carry out the image coding processes for the areas B' and C', respectively. Consequently, the first, second and third DSPs 2 have their numbers of valid pixels EA', EB' and EC' for coding virtually made even, i.e., the same quantity of image data to be processed, as shown in FIG. 12(b). As a result, the maximum volume of process M' dealt with by the inventive apparatus becomes sufficiently less than the volume M of the conventional apparatus, and the process time required for each DSP block is reduced.

Figure 14:
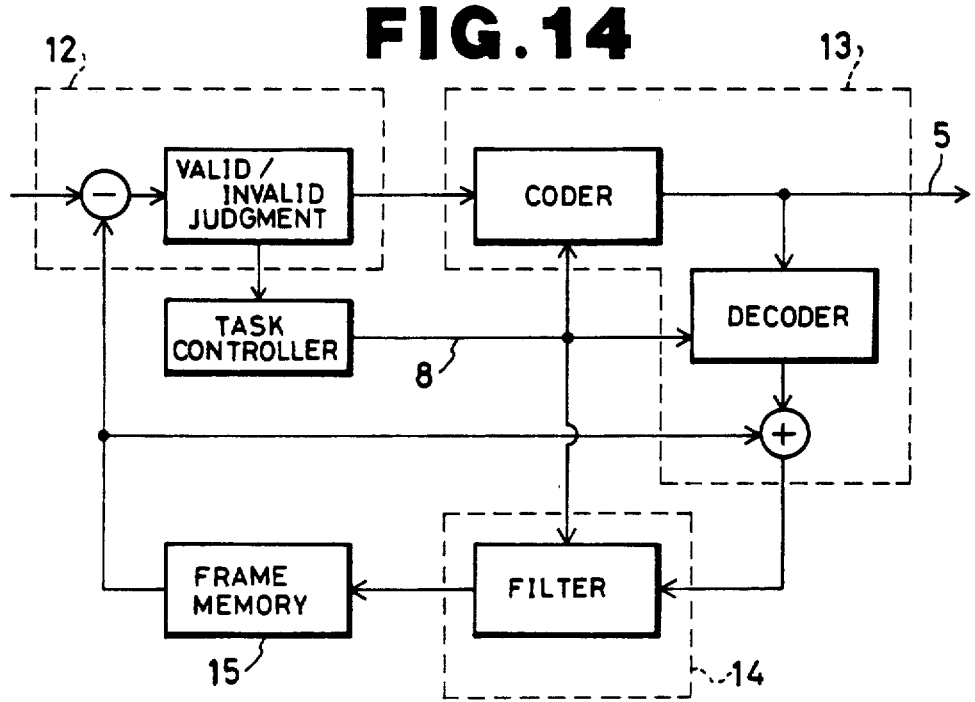
FIG. 14 is a diagram showing the concept of process of each DSP block shown in FIG. 13.
Figure 9B:
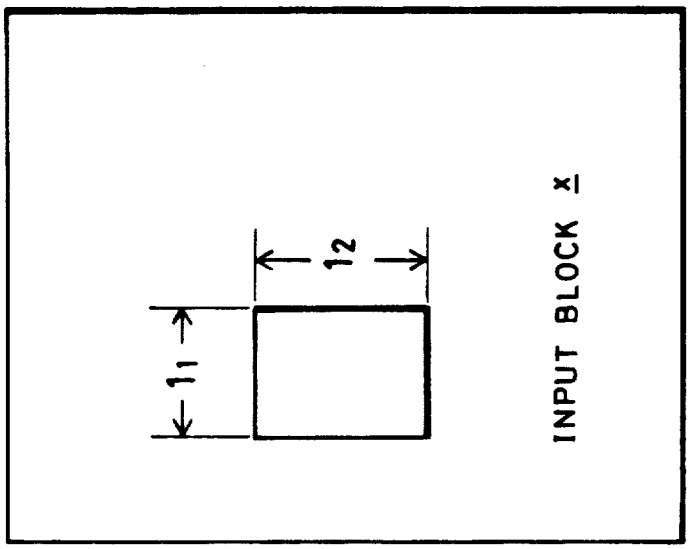
FIGS. 9(a) and 9(b) are diagrams used to explain the conventional motion compensative operation method.
Figure 9A:
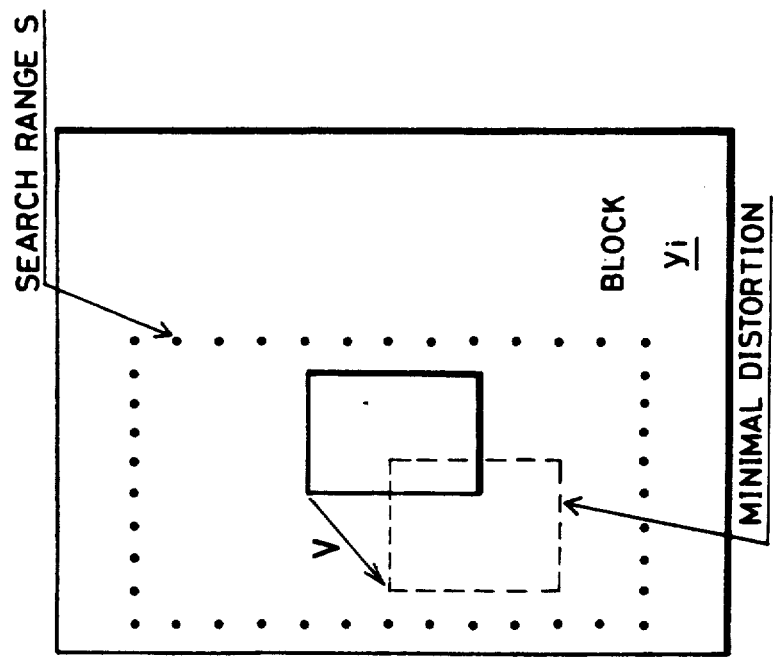
Figure 13:
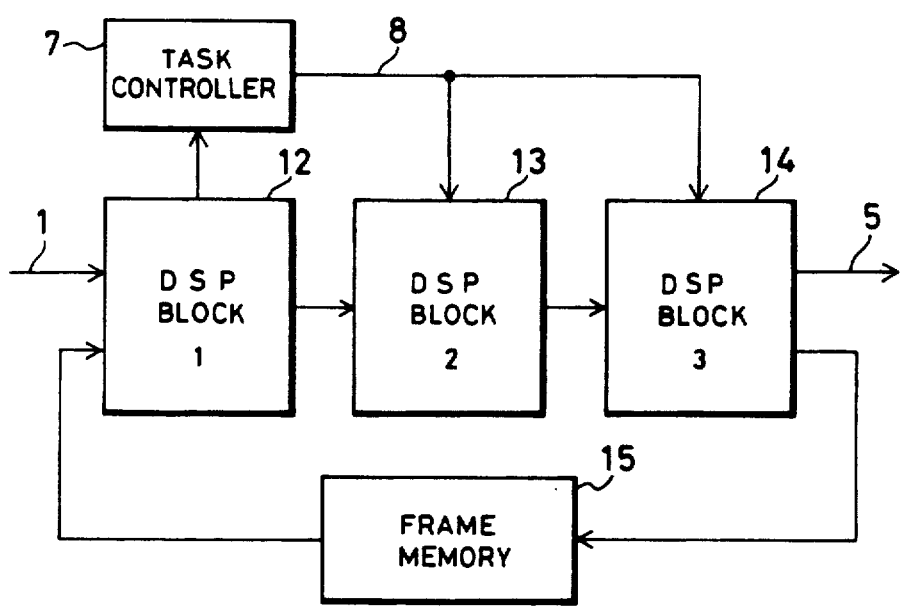
FIG. 13 is a block diagram showing the arrangement of the digital signal processing apparatus formed by connecting in cascades a plurality of digital signal processors (DSP blocks) shown in FIG. 11.

FIG. 13 shows an inter-frame coder constructed by a serial connection of DSP blocks in three stages. Each DSP block performs the process shown in FIG. 14. The first DSP block 12 receives upon the input data 1 and, after producing a differential signal, implements the valid/invalid judgment, evaluates the distribution of the numbers of valid pixels in the image data, and sends the information to the task controller 7. Based on the information, the task controller 7 issues address control signals 8 for dictating an address adjustment such that the DSPs in the second DSP block 13 have even assignments of data. Each DSP in the second DSP block 13 implements the process by adjusting the read address as described above. The third DSP block 14 is designed to operate as the second block 13 identically.

Although in the foregoing embodiment the DSP process assignment areas are controlled on the basis of the valid pixel distribution among areas in image data, the present invention is not confined to this scheme, but feedback DSP assignment control based on the general quantity distribution of transmitted information is also possible, for example.

A second embodiment of this invention will be explained with reference to the drawings. FIG. 15 shows an example of the configuration of a digital signal processing apparatus, the second embodiment of this invention. In the figure, 301 is a data flow control section (D F C) working as a control means; 302 are control parameter data output from the data flow control section 301; 303 is a common memory (C M) which stores feedback data, a large capacity data and table, etc.; 304 is a task table (T B) which stores a processing status of each signal processor element (P E) 318; 305 is a common bus (C-BUS) which has the function as a status communicating means consisting of at least a bus connected to the common memory 303, the task table 304 and each signal processor element 318; 306 is a video frame synchronizing signal (F p) which discriminates the starting point of a video frame to be supplied to the data flow control section 301 in the case of inputting video signals etc.; 307 are feedback data (F b) which inform the data flow control section 301 of the occupying status, data quantity of a sending buffer etc. and finishing of one frame of data processing etc. output from an output control section 308 described later; 308 is an output control section (O C) provided with a buffer memory for outputting data at a certain constant speed in restructuring processed blocks output from a plurality of signal processor elements (P E) 318 for example in the scanning order of a video frame; 309 is an input terminal of analog signals; 310 is an A/D converter; 311 are digitized input data; 312 is a parameter memory (P M) consisting of dual port memories; 313 is an input frame buffer consisting of dual port memories for functioning as a block formation means by memorizing input data 311 temporarily; 314 is a bus connecting the parameter memory 312 to the signal processors elements 318; 315 is a bus connecting the input frame buffer 313 to the signal processors 318 in order to supply data in a block unit; 316 is a common bus input/output port connected to the common bus 305; 317 is an interruption control port for sending/receiving timing control signals from the data flow control section 301; 318 are individual signal processor elements (P E) and these signal processor elements are provided with software which functions as a starting means, and these signal processor elements are mutually connected via buses 314 and 315, and the last stage signal processor element 318 and the output control section 308 are also connected via buses 314 and 315; 319 is an output terminal through which data are output at a certain constant speed and timing from the output control section 308;

320 is a multiprocessor module comprising the parameter memory 312, the input frame buffer 313 and a plurality of signal processor elements 318 connected in series through the buses 314 and 315, for example.

The data flow control section 301 has a judgment means which scans the task table 304 at a certain constant cycle and judges the processing conditions of individual signal processor elements 318. The data flow control section 301 also has a control means which based on the result of the judgment means decides if each signal processing module can process the next signal process block and when the processing is found to be possible it makes process start by sending out an interruption signal to the interruption control port 317 and when the processing is found to be impossible it instructs the transfer of the signal process block to another signal processing module which can process the block. When a parallel processing of a constant cycle, in which the task table 304 is scanned, is to be done the scanning period shall be the number of parallel parallelness times of the input cycle of the signal process block, and when a series processing is to be done the scanning period shall be 1/n of the input cycle; thus by the synchronization with the input data frame (for example a video frame) the matching with the real time can be maintained.

Figure 16:
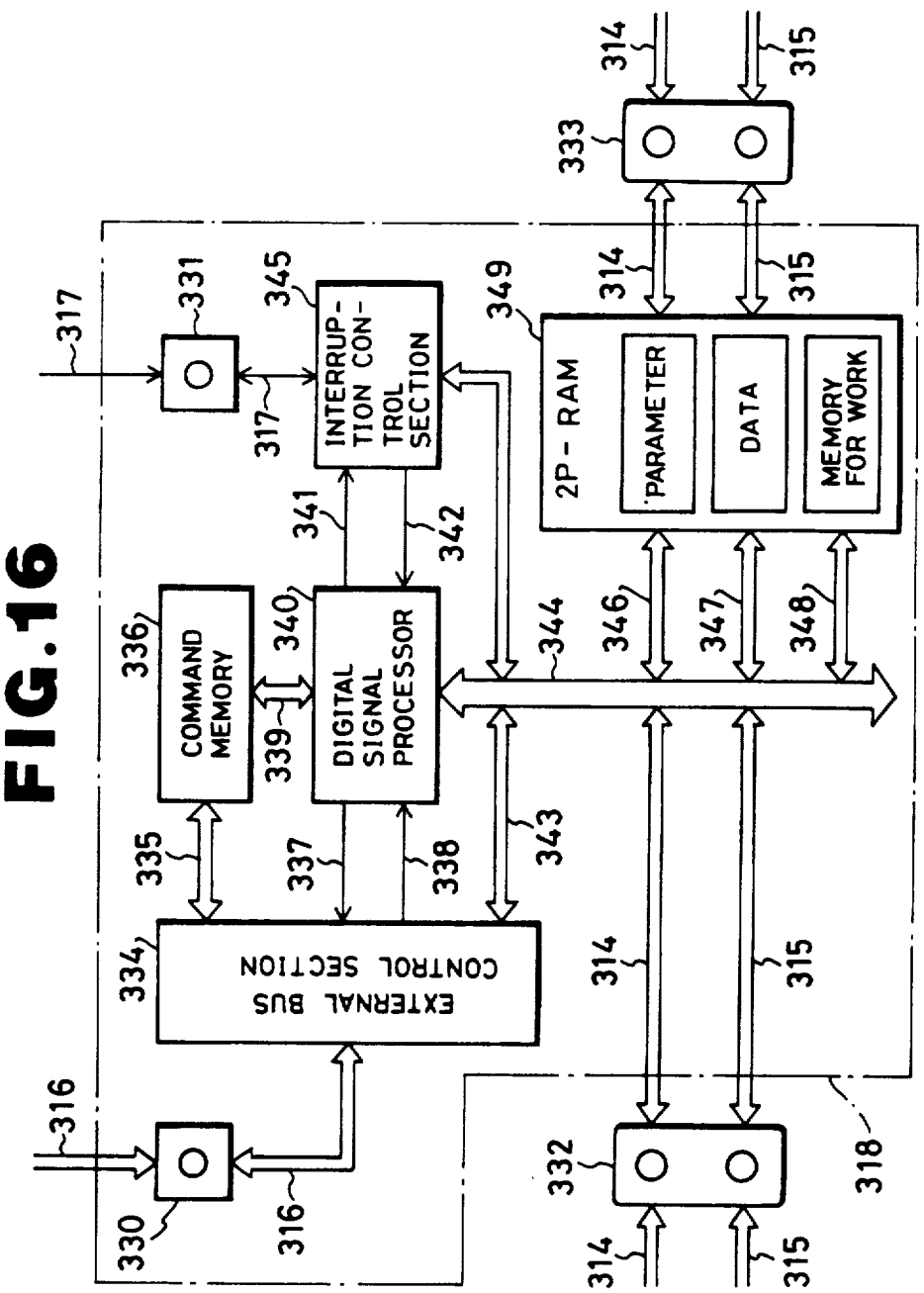
FIG. 16 is a block diagram showing the internal arrangement of the signal processor shown in FIG. 15.

FIG. 16 shows an example of the internal constitution of the signal processor elements 318 as shown in FIG. 15. In the figure, 330 is a terminal to which the common bus input/output port 316 is to be connected; 331 is a terminal to which the interruption control port 317 is to be connected; 332 is a terminal to which the buses 314 and 315 are to be connected; 333 is similarly a terminal which connects the buses 314 and 315 between the adjacent signal processors; 334 is an external bus control section (BUS-CONT) with the function as a competitive control means to control the make/break of the common bus 305 through the bus 316; 335 is a bus for loading a writable control storage (W C S) 336, which stores a signal processing program, from the external bus control section 334 at an initial time; 337 is a BUS-REQ which requires the connection of the common bus 305 to the external bus control section 334; 338 is a BUSACK which denotes the permission for the BUS-REQ 337; 339 are command codes which are successively read out from the control storage 336 according to the signal processing program; 340 is a digital signal processor (D S P) which executes data processing; 341 is an INTACK which informs an interruption control section (INTER-CONT) 345 of the reception of an interruption from the digital signal processor 340; 342 is, on the contrary, an INTREQ which informs the digital signal processor 340 of the requirement of an interruption; 343 is a bus to connect an internal bus 344 to the common bus 305 through the external bus control section 334, and the internal bus 344 is directly connected to the digital signal processor 340; 345 is an interruption control section (INTR-CONT) which processes an interruption signal from the data flow control section 301; 346 is a bus which writes the parameter of a processed data block into a dual port memory 349 through the internal bus 344; 347 is similarly a bus which writes a processed block into the dual port memory 349; 348 is a bus which connects a work memory in the dual port memory 349 and the internal bus 344; 349 is a dual port memory provided with a parameter memory, data memory and work memory which outputs data to the adjacent signal processor element 318 through the terminal 333 and buses 314 and 315.

Figure 17:
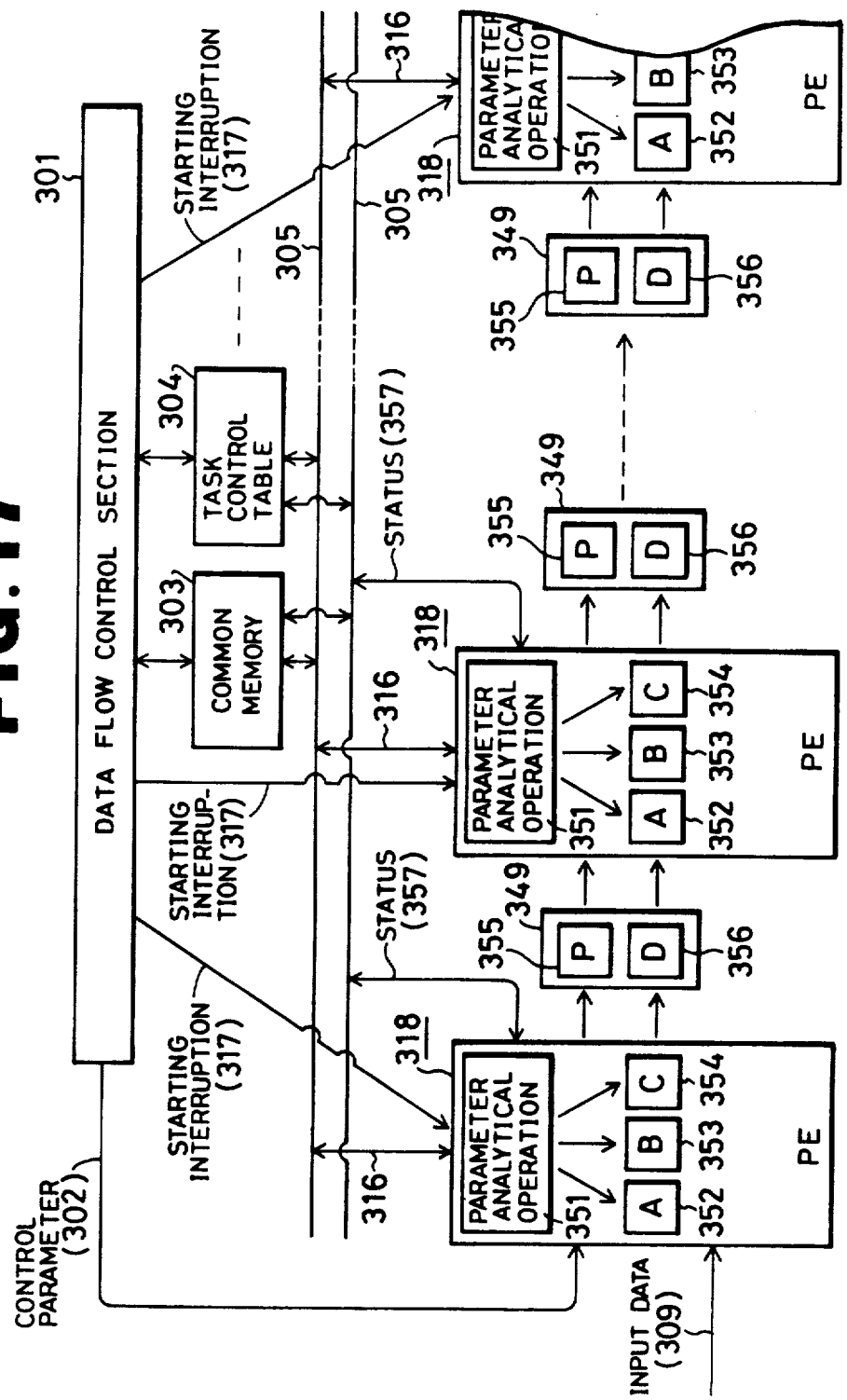
FIG. 17 is a diagram explaining the concept of control operation of the digital signal processing apparatus shown in FIG. 15.

FIG. 17 explains the internal control operation of the digital signal processing apparatus shown in FIG. 15, and the same parts as those shown in FIG. 15 are given the same symbols; explanation is therefore omitted.

In the figure, 351 is a block which shows analytical operation of a parameter inside the signal processor element 318; 352, 353, 354 are blocks which show the operation of individual signal processing subroutines A, B and C according to individual parameters; 355 is a block which shows the contents of a parameter stored in the dual port memory 349; 356 is a block which shows the contents D of processed block data memorized in the dual port memory 349.

FIG. 18 explains an example of the relation between the parameter data and process block data until a data block is successively given a series of function processes and an output result is obtained through series and parallel processes of block units executed in the digital signal processing apparatus shown in FIG. 15. In the figure, 360 is a block address (B A D) showing the position of an input block in a frame; 361 is a processing number (PN) showing the kind of a process to be given to said block; 362 is a flag (PFLG) which discriminates the result of the process; 363 is a data block in which for example eight subblocks are combined to form a block.

Figure 19:
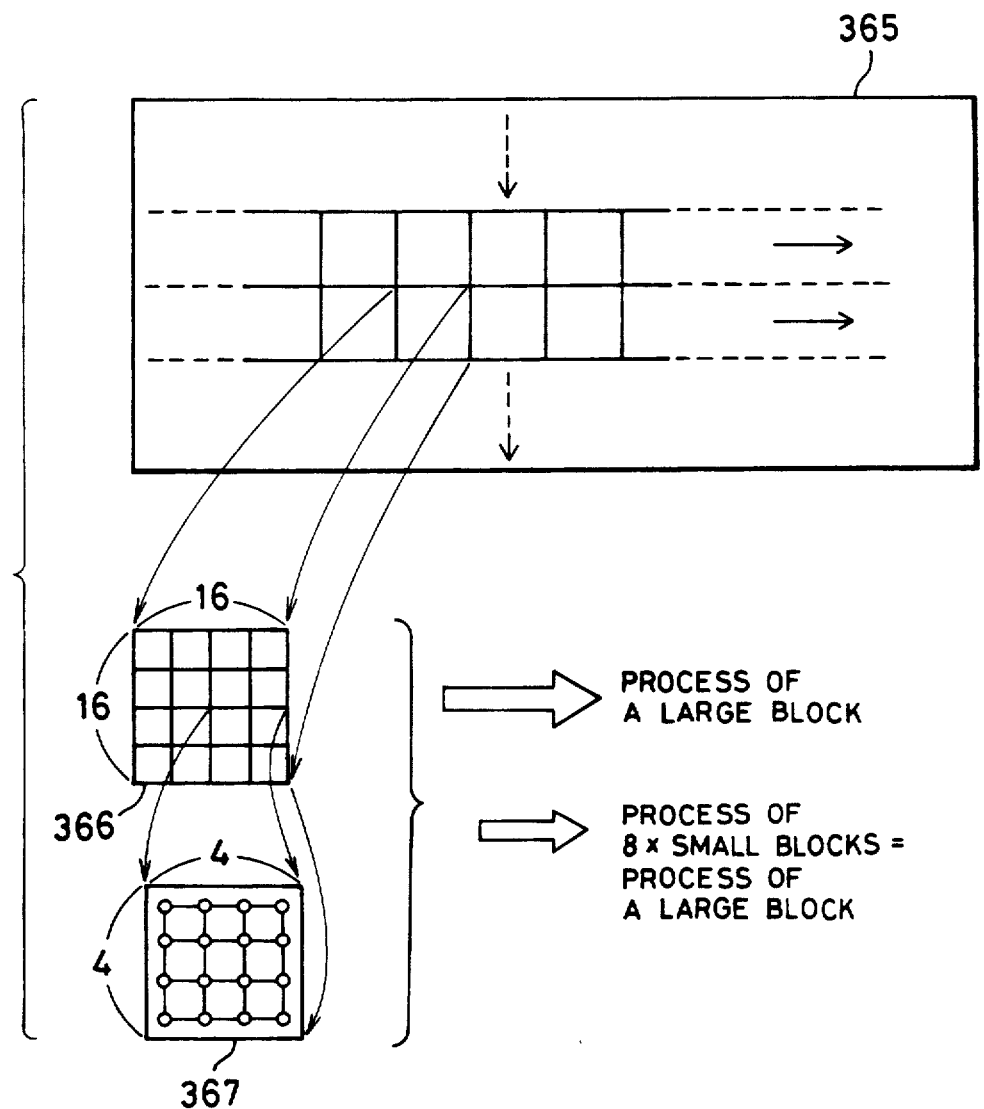
FIG. 19 is a diagram showing the correspondence between data blocks and a frame.

FIG. 19 shows an example of correspondence between the data block 363 shown in FIG. 18 and one video frame when a picture coding process is performed in this system. In the figure, 365 is one video frame; 366 is a data block when a picture is divided into 16 lines × 16 pixels; 367 is a subblock which is obtained when the block is further divided into 8 blocks of 4 lines × 4 pixels.

An explanation of the operation based on FIG. 15 is given in the following. Input data 311 digitized by an A/D converter 310 are stored in an input frame buffer 313 being scanned in a raster form in synchronization with a video frame synchronizing signal 6, for example. Input data 311 memorized in the input frame buffer 313 are added to initial parameter data 302 by the data flow control section 301 by blocks and the parameter data 302 are memorized in the parameter memory 312. The parameter memory 312 and input frame buffer 313 consist of dual port memories and writing/reading is simultaneously possible between two independent ports.

Data blocks are read from the input frame buffer 313, and the parameter is read in a data block unit from the parameter memory 312. Data blocks and parameter are sent through the buses 314 and 315 to the signal processor element 318 where they are given the first process of a series of functional processes in a block unit. Next, the results and the rewritten parameters are written in, the dual port memory 349 in the signal processor element 318. It is the basic function of a processor module 320 to execute processes successively between the adjacent signal processor elements 318 and to execute a pipeline processing for each block unit.

When a processing is executed for each block unit, if feedback data such as coded previous frame data are to be referred to, feedback data are input to the common memory 303 connected to the common bus 305 and memorized. The process of a new video frame is performed by such processing that the signal processor element 318 other than the one which data have been written through common bus 305 refers the common memory 303. If the writing of the feedback data of the previous frame is not completed in the proper position in the common memory 303, the execution time of the process shall be specified.

When the processing of a unit (block processing) is finished, each signal processor element 381 memorizes the status showing the completion of the present processing in the task table 304, and waits for the next processing. The data flow control section 301 scans the task table 304 and when the processing of the former stage signal processor element 318 is completed, it sends out an interruption signal to said signal processor element 318 and start the next processing. By repeating the operation, the execution of the operation control of each signal processor element 318 is performed.

To conduct parallel processing in a block unit for each processor module 320, the data processing condition in the input frame buffer 313 of each processor module 320 is detected with the status information of the initial stage signal processor element 318 and individual block data are distributed by proper load distribution and input to each multi-processor module 320.

These results are shown by the control parameter data of the initial stage and the signal processor element 318 discriminates the processing for the block by deciphering the above results and executes a proper processing. Among these processings there are for example functional processors such as a block identifier 253, a coder 254, a local decoder 260, an inter-frame subtracter 252, a motion compensator 265, an inter-frame adder 261, a variable length coder 256, and besides them a processing which performs only load distribution such as a processing of transferring block data is included.

In the data flow control section 301, it is possible to make an arbitrary signal processor element 318 undertake an arbitrary processing by controlling the first stage parameter; owing to such performance as mentioned above the load can be so distributed to signal processor element 318 as to make them work efficiently as much as possible.

The output control section 308 reconstitutes processed blocks which are output at random times into for example a scanning order of an input video frame and produces a resultant output for an output terminal 319 and also produces feedback data 307 to inform the data flow control section 301 of these data.

Figure 5:
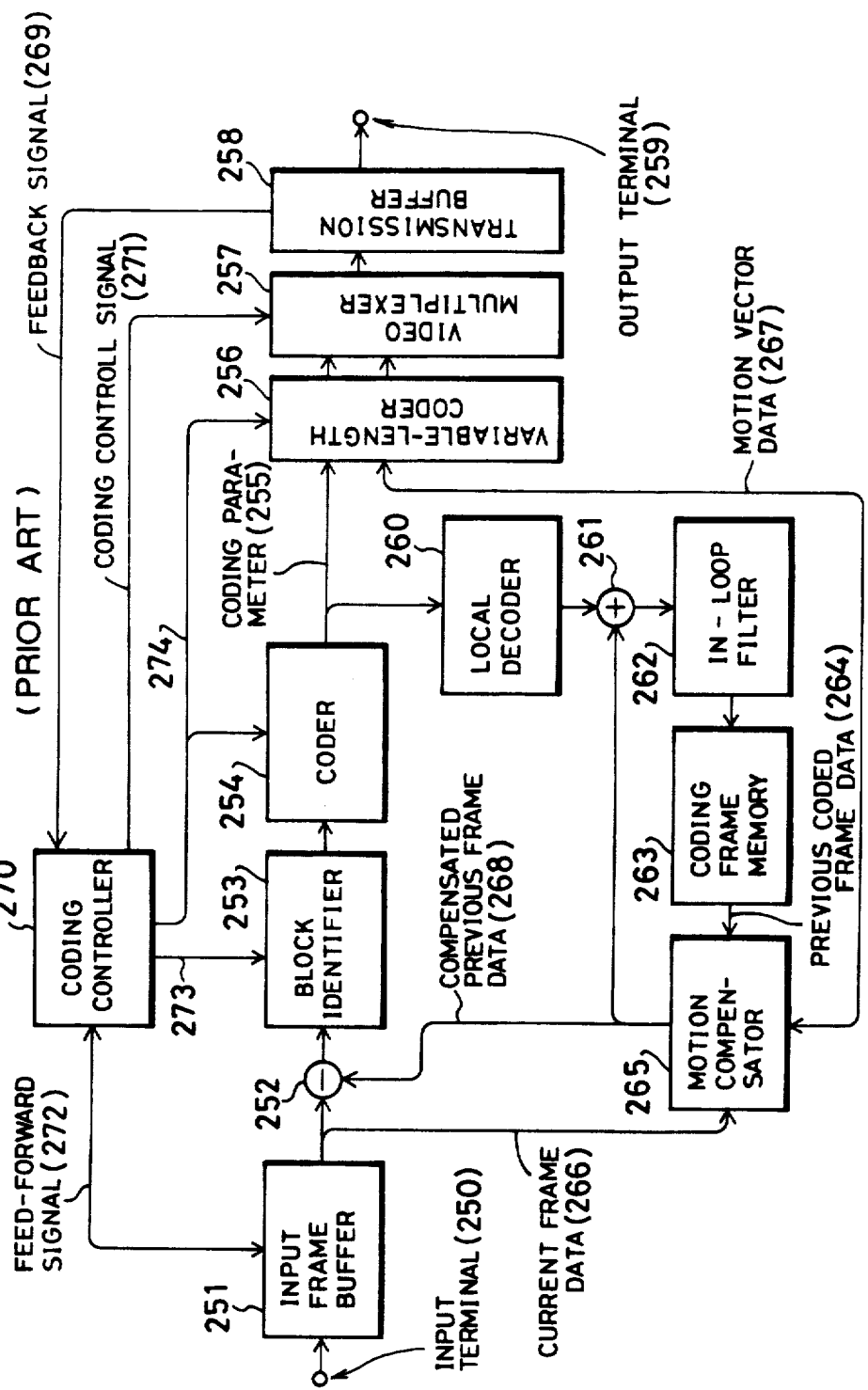
FIG. 5 is a block diagram showing the configuration of the high-efficiency coder for a moving image.
Figure 6:
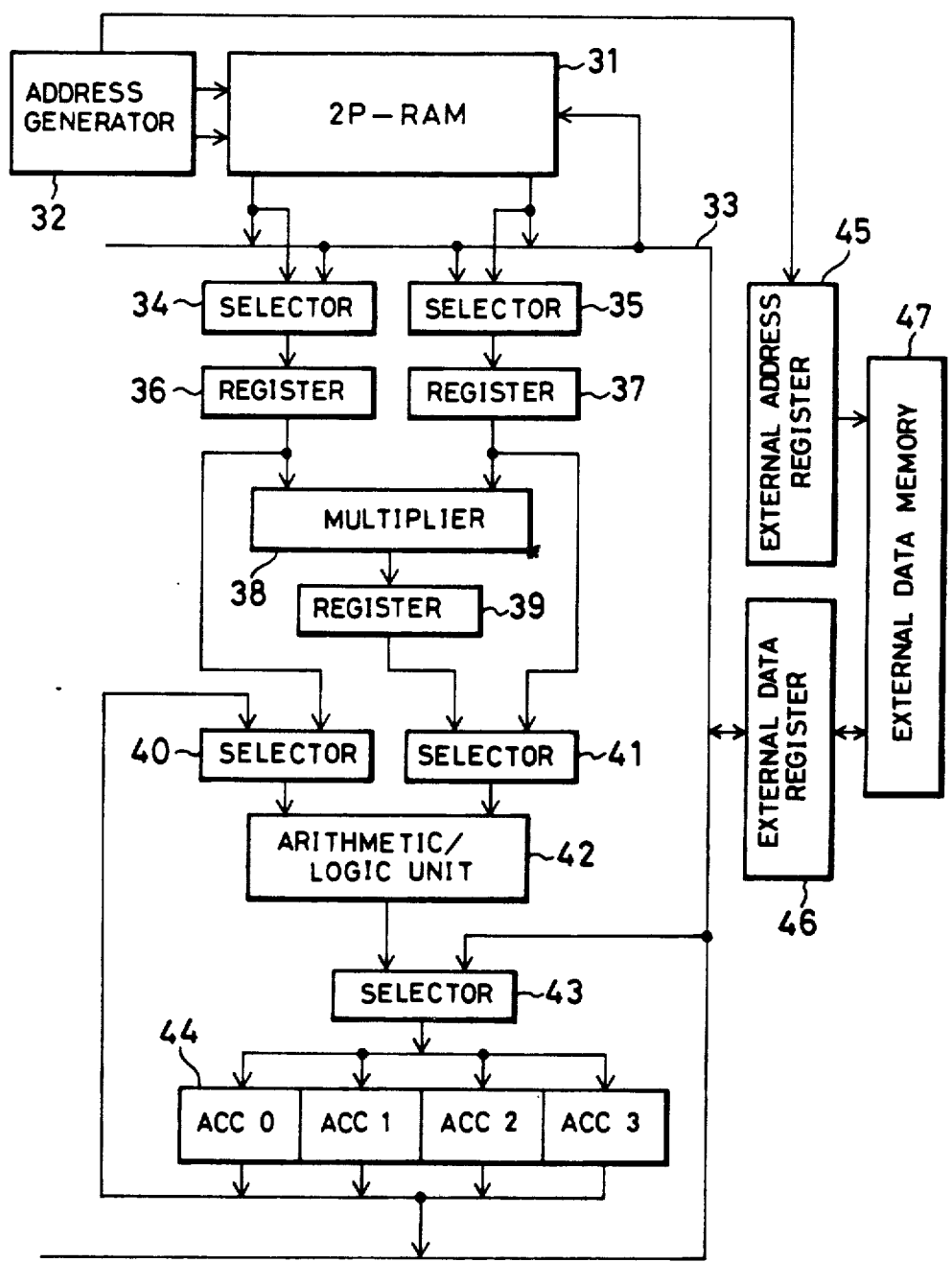
FIG. 6 is a block diagram showing the arrangement of a third conventional digital signal processing apparatus.
Figure 7:
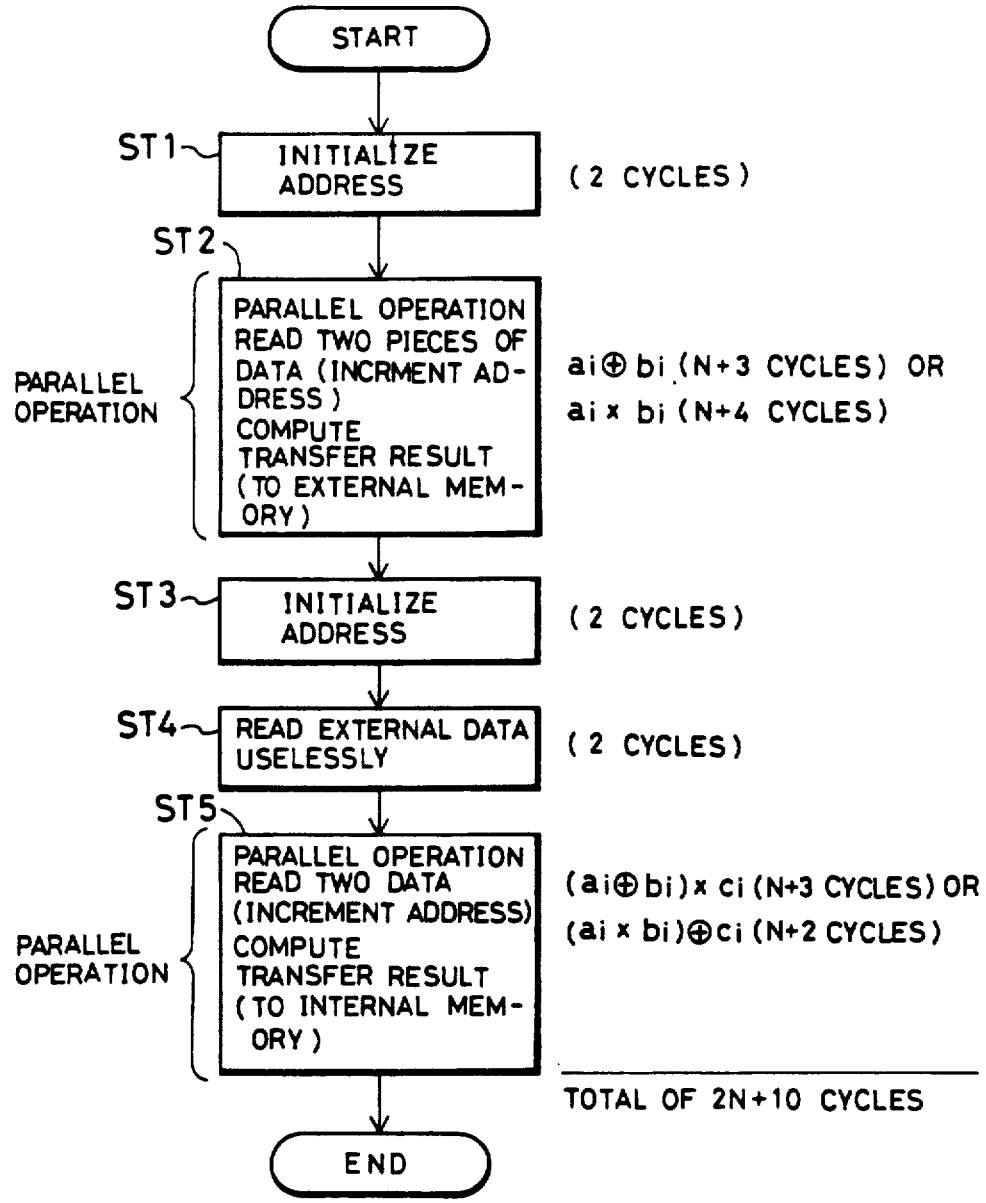
FIG. 7 is a flowchart showing the process of 3-input arithmetic operation using the digital signal processing apparatus shown in FIG. 6.
Figure 8:
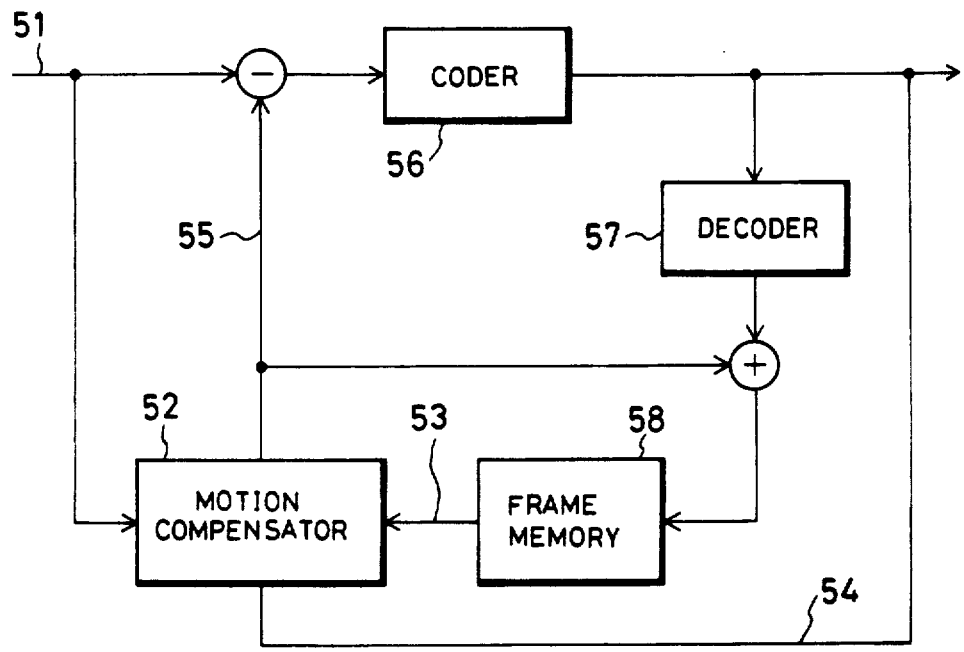
FIG. 8 is a block diagram showing in brief the arrangement of the image coding transmitter which carries out the conventional motion compensative operation method.

The output control section 308 takes charge for example of a video multiplex section 257 and a transmitting buffer 258 shown in FIG. 5, and it outputs a feedback signal 269 from the transmitting buffer 258 to a coding control section 270 which takes charge of the data flow control section shown in FIG. 15.

The data flow control section 301 takes charge of the functions of above-mentioned load distribution and the coding control section 270 as shown in FIG. 5, and finds the block identification control signal 273 and coding control signal 274 and multiplexes them in the control parameter data for the execution of the whole characteristic control. Refer to FIG. 16; the processing of a single signal processor elements 318 is started by the interruption from the data flow control section 301, and the contents of the parameter memory 312 is input to it through an internal bus 344. On the basis of the discrimination result of the contents, the processing of one unit of block data is performed by a digital signal processor 340.

The result and rewritten parameters are written in a dual port memory 349, and the status is set in the task table 304 through an external bus control section 334;

thus the preparation for the next process is ready. An interruption control section 345 interfaces the interruption from the data flow control section 301 with the digital signal processor 340. The parameter and the data written in the dual port memory 349 are read by an adjacent signal processor element 318 which is connected to a terminal 333, and the next stage process is given.

FIG. 17 shows the flow of these processes performed by the data flow control section 301, and it shows the relation between the control of writing/referring of feedback data to the common memory 303 and the control of status writing in the task table 304 by the data flow control section 301 through the common bus 305, and the start processing control in the signal processor element 318 by a parameter analyzer 351.

FIG. 18 shows the rewriting of the contents of control parameter data 302, which are added corresponding to an input block data 363, and the flow of these processes. A block address which shows for example the position in a frame or time sequential order of a block, and a flag 362 which is referred to on the kind of the next process and the contents of the next process are contained in the control parameter data 302. The block address 360 is used for the discrimination of a special process in a certain case for example with an end point in a picture or for the restructure of data in the output control section 308 when a process is finished. The flag 362 shows for example the results etc. of coding control information 271, a block identification control signal 273, coding control signal 274, and a block identifier 253 as shown in FIG. 5. Input block data 363 are set to have the minimum size handled in a unit processing. The motion compensator 265 shown in FIG. 5 has a block of 16×16 size and after the block identifier 253 blocks of 4×4 size are handled. In such a case as mentioned above where a block size differs for each unit processing, block sizes are arranged to have matching between a maximum block size and a subblock size contained within it. In this case, eight pieces of 4×4 blocks are combined to constitute a 16×16 block. When coding of a picture is performed, this block corresponds to a small picture element made by dividing an ordinary one frame into small square picture elements.

FIG. 19 shows an example where one video frame 365 is divided into a block 366 and subblocks 367.

In the above embodiment, a signal processor element 318, which has a single digital signal processor 340, is shown but when a higher speed processing is preferable a hierarchical structure combined with a plural number of digital signal processors can be used. The constitution of the signal processor element 318 in the case of the hierarchical structure is shown in FIG. 20. In this case, as the load for the data flow control section 301 increases a local data flow control section 370, a local common memory 371, and a local task table 372 are provided inside the signal processor element 318 in order to locally execute the optimum load distribution inside the signal processor. The data flow of the digital signal processor 340 which is connected to a local common bus 373 is the same as that shown in FIG. 15 except that the operation is executed inside the signal processor element 318.

In the above embodiment, a series/parallel structure is adopted but in some cases a complete parallel or complete series structure is effective according to the purpose of a signal processing and a real time processing could be possible.

Figure 21:
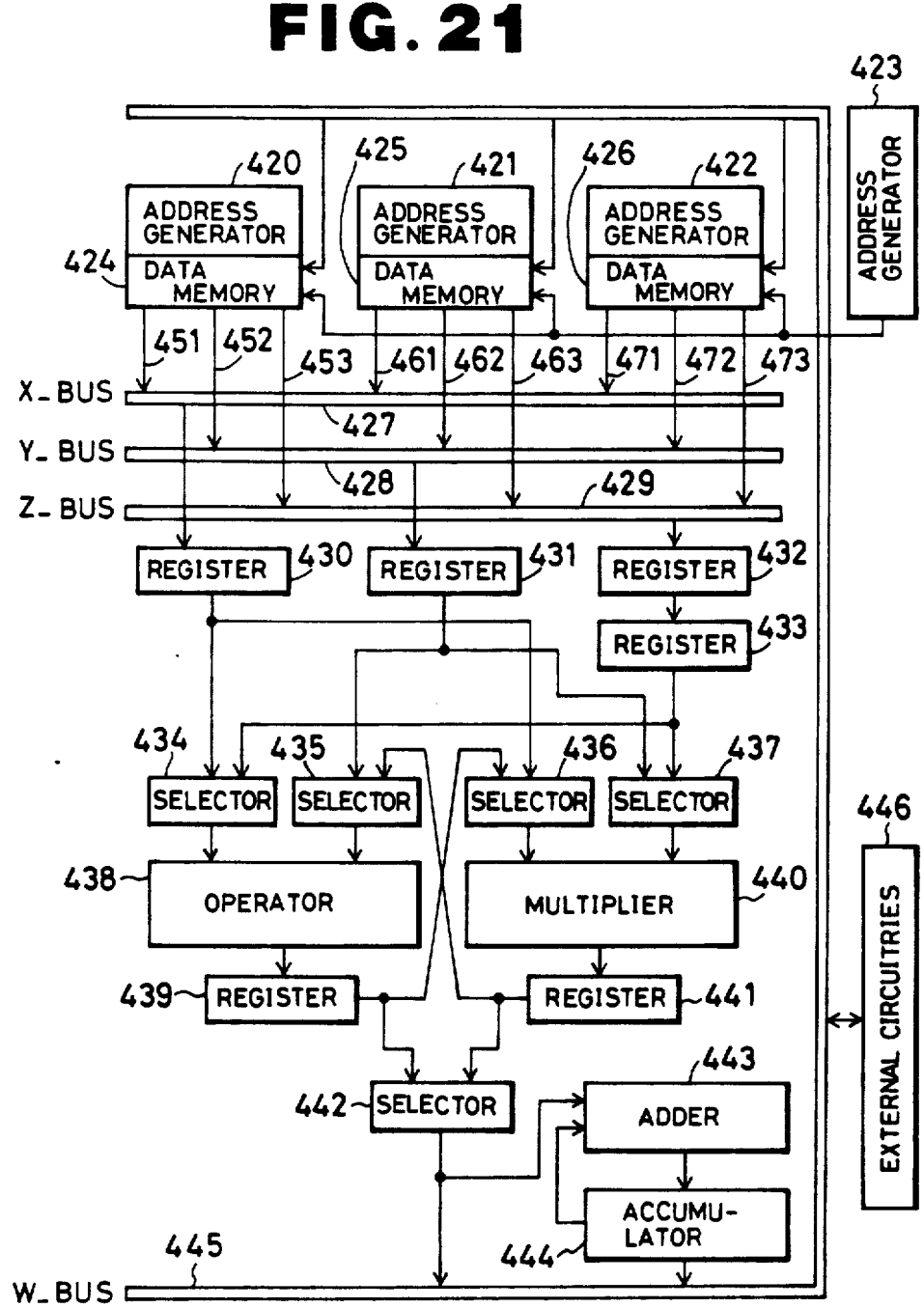
FIG. 21 is a block diagram showing the digital signal processing apparatus based on another embodiment of this invention.

The other embodiment of this invention is explained with reference to FIG. 21. In FIG. 21, 420, 421 and 422 are address generators for readout data; 423 is an address generator for writing data; 424, 425 and 426 are data memories, and address data generated by the address generator 423 are input to these memories; 427, 428 and 429 are data buses which transfer readout data from the data memories 424, 425 and 426; 430, 431 and 432 are registers for holding data transferred from data buses 427, 428 and 429; 433 is a register to hold the output of the register 432; 434 is a selector to select the output of the register 430 or that of the register 433; 435 is a selector to select the output of the register 431 or that of the register 441; the selector 434 and the selector 435 constitute a first selector group; 436 is a selector to select the output of the register 430 or the output of a register 439; 437 is a selector to select the output of the register 431 or the output of the register 433; the selector 436 and the selector 437 constitute a second selector group; 438 is an operator which operates by inputting the output of the selectors 434 and 435; 440 is a multiplier which performs multiplication by inputting the output of selectors 436 and 437; the register 439 holds the output of the operator 438; a register 441 holds the output of the multiplier 440; 442 is a selector which selects the input from the register 439 or the input from the register 441 and outputs it; 443 is an adder which adds the output of the output selector 442 and the output of an accumulator 444 and outputs to said accumulator 444; 445 is a data bus to transfer output data of the accumulator 444 and the output selector 442; 446 is an interface circuit which performs outputting/inputting of data to/from external circuits; 451–453, 461–463, 471–473 denote signal lines which output the output of data memories 424, 425 and 426 to data buses 427, 428 and 429.

The following are the explanation of operation. In FIG. 21, assume that data series with N elements, A=(ai|i=1 to N), B=(bi|i=1 to N), C=(ci|i=1 to N) are previously stored respectively in the data memory 424, data memory 425, and data memory 426.

Under the conditions above, the operation when the operation of three inputs and one output is performed is shown below. The operation processing flow is shown in FIG. 22.

To begin with, at a step ST31, top addresses of three series of input data and of an output result storing memory are initially set by address generators 420, 421 and 422. After that the ,address generators are assumed to simply increment the initially set addresses.

The data memory 424 corresponds to the address generator 420; the data memory 425 corresponds to the address generator 421; the data memory 426 corresponds to the address generator 422. Individual data memories 424, 425 and 426 readout data based on the addresses of address generators 420, 421 and 422.

Data are input to three data buses 427, 428 and 429 (X-BUS, Y-BUS, Z-BUS) respectively from data memories 424, 425 and 426, so that for the outputting of each of these data memories 424, 425 and 426 to a specified data bus, only one bus out of three is controlled to be effective, and the other two are controlled to be in the state of a high impedance. In this case, the output of data buses is limited to that of the one which is made to be effective. For example, when A data series is to be input to the register 430, the A series data are output to the signal line 451, and the signal lines 461 and 471, which output data from other data memories 425 and 426 to the data bus 427, are in the state of a high impedance. The same thing goes for other data buses.

Each of these data series are set respectively in the registers 430, 431 and 432. Three data buses 427, 428 and 429 can select data from three data memories 424, 425 and 426, so that $3^3$ kinds of data set combinations can be supplied to the registers 430, 431 and 432.

Two expressions as shown below are defined in the way of three input operations and then the processing method is shown in the following:

$$(ai \oplus bi) \times ci \quad (7)$$

$$(ai \times bi) \oplus ci \quad (8)$$

where $(x \oplus y)$ expresses an arithmetic and logic operation for finding results or values of addition, subtraction, maximum values or minimum values for two input data x, y, and $(x \times y)$ expresses multiplication. The explanation of operation processing flow of the expression selects the input of register 433. By the use of these two data, $(ai \oplus bi)$ is multiplied by ci with the multiplier 440 and the result $(ai \oplus bi) \times ci$ is stored in a register 441. This value is output from the register 441 in the next step. By an output selector 442's selecting the register 441, the data $(ai \oplus bi) \times ci$ are sent to one of the data memories 424, 425 and 426 through a data bus 445 based on the address shown by the address generator 423.

In this invention, readout of data, execution of operation and writing of data are continuously executed by a pipeline processing, so that the control of each section can be operated in parallel. Therefore if the three input one output operation is executed for a data series with N elements, from the time when the first datum is readout until the time when the processing result of the last datum is written into a memory, the period of (N+3) cycles are required.

The explanation of operation processing flow of expression (8) is given in Table 4. The mark "x" in Table 4 represents an unknown.

TABLE 4

| Machine cycle | Register 430 | Register 431 | Register 432 | Register 433 | Register 439 | Register 441 | Output of output selector 442 |
|---|---|---|---|---|---|---|---|
| 1 | $a_1$ | $b_1$ | $c_1$ | x | x | x | x |
| 2 | $a_2$ | $b_2$ | $c_2$ | $c_1$ | x | $a_1 \times b_1$ | x |
| 3 | $a_3$ | $b_3$ | $c_3$ | $c_2$ | $(a_1 \times b_1) \oplus c_1$ | $a_2 \times b_2$ | x |
| 4 | $a_4$ | $b_4$ | $c_4$ | $c_3$ | $(a_2 \times b_2) \oplus c_2$ | $a_3 \times b_3$ | $(a_1 \times b_1) \oplus c_1$ |
| . | . | . | . | . | . | . | . |
| N | $a_N$ | $b_N$ | $c_N$ | $c_{N-1}$ | . | . | . |
| N+1 | x | x | x | $c_N$ | . | $a_N \times b_N$ | . |
| N+2 | x | x | x | x | $(a_N \times b_N) \oplus c_N$ | x | . |
| N+3 | x | x | x | x | x | x | $(a_N \times b_N) \oplus c_N$ |

(7) is given in the Table 3. "x" marks in the table represent unknowns.

The operation in which three input data are readout to registers 430, 431 and 432 is the same as that in the

TABLE 3

| Machine cycle | Register 430 | Register 431 | Register 432 | Register 433 | Register 439 | Register 441 | Output of output selector 442 |
|---|---|---|---|---|---|---|---|
| 1 | $a_1$ | $b_1$ | $c_1$ | x | x | x | x |
| 2 | $a_2$ | $b_2$ | $c_2$ | $c_1$ | $a_1 \oplus b_1$ | x | x |
| 3 | $a_3$ | $b_3$ | $c_3$ | $c_2$ | $a_2 \oplus b_2$ | $(a_1 \oplus b_1) \times c_1$ | x |
| 4 | $a_4$ | $b_4$ | $c_4$ | $c_3$ | $a_3 \oplus b_3$ | $(a_1 \oplus b_2) \times c_2$ | |
| . | . | . | . | . | . | . | . |
| N | $a_N$ | $b_N$ | $c_N$ | $c_{N-1}$ | $a_{N-1} \oplus b_{N-1}$ | . | . |
| N+1 | x | x | x | $c_N$ | $a_N \oplus b_N$ | . | . |
| N+2 | x | x | x | x | x | $(a_N \oplus b_N) \times c_N$ | . |
| N+3 | x | x | x | x | x | x | $(a_N \oplus b_N) \times c_N$ |

At a step ST32 a selector 434 selects the side of a register 430 and a selector 431 selects the side of a register 435. By the use of these two selected data (ai and bi) the operation $(ai \oplus bi)$ is performed with an operator 438, and the result is stored in a register 439. This value is output from the register 439 in the next step.

The data ci in the register 432 are delayed by the register 433 by one step. In the next step a selector 436 selects the side of the register 439 and a selector 437 case of expression (7). When the operation of expression (8) is executed, the selector 436 selects the side of the register 430 and the selector 437 selects the side of the register 431, and the operation $(ai \times bi)$ is performed by the multiplier 440 and the result is set in the register 441.

In the next step, the selector 434 selects the input of the, register 433 and the selector 435 selects the input of the register 441, and the operation $(ai \times bi) \oplus ci$ is executed by the operator 438 and the result is set in the register 439. In the next step, by the selector 442's selecting the side of the register 439 the selection result is written into one of the data memories 424 to 426.

Thus the case of the operation of expression (8) is the same as the case of expression (7), thereby the total processing time requires $(N+3)$ cycles.

In the case of the operation of two input one output, the value of $(ai \oplus bi)$ can be obtained through the procedure as shown in the following: the selector 434 selects the input of the register 430 and the selector 435 selects the input of the register 431 and after the operation is executed by the operator 438 the input of the register 439 is selected by the selector 442 in the next step. The value of $(ai \times bi)$ can be obtained through the procedure as shown in the following: the selector 436 selects the input of the register 430 and the selector 437 selects the input of the register 431, and after the execution of the operation with the multiplexer 440 the selector 442 selects the input of the register 441 in the next step.

The processing speed in the case of three input one output is $(2N + 10/N + 7)$ times of that of prior art, that is almost half times if N is a large number.

When a cumulative value is to be found in the three input one output operation, a cumulative value to an intermediate point or an initial value is stored in the accumulator 444 and each one of the successive operation results is added to the cumulative value in the accumulator 444 with the adder 443 and the added result is stored in the accumulator 444 again. These processes are performed repeatedly. Processing cycles therefore are not increased due to cumulative operation.

Figure 23:
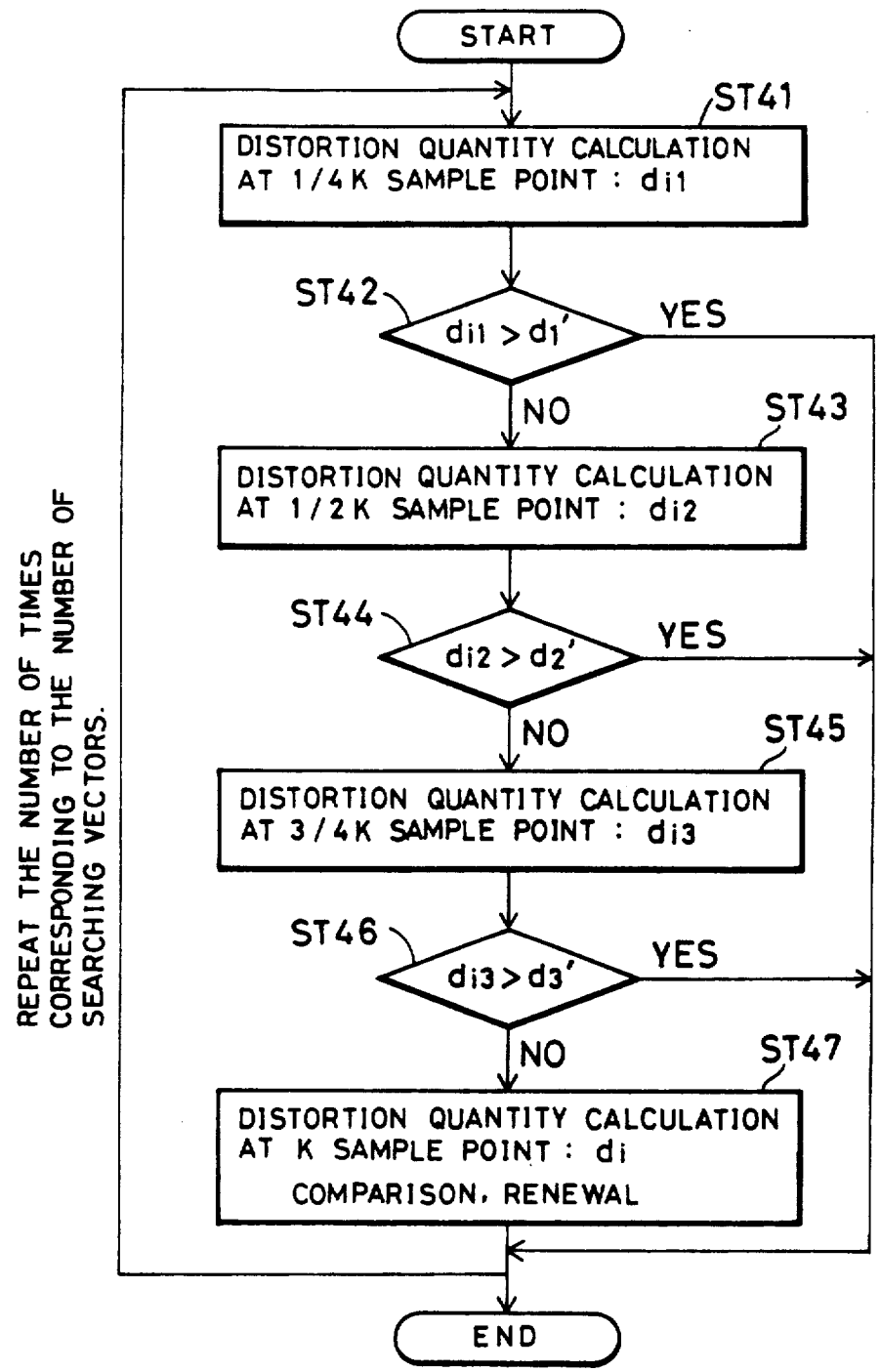
FIG. 23 is a flowchart showing an embodiment of the inventive motion compensative operation method using a digital signal processing apparatus.
Figure 25:
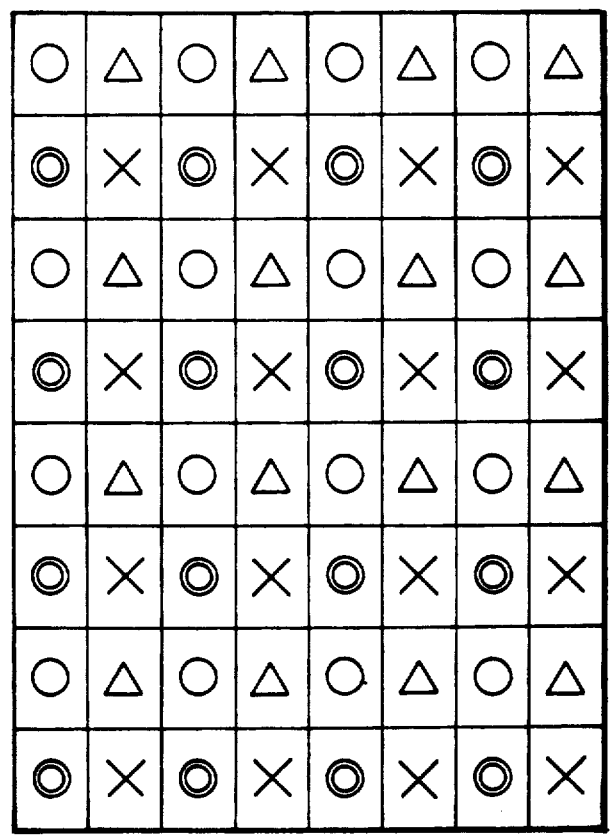
FIG. 25 is a diagram showing the arrangement of pixel samples at sampling points in a block according to the intermediate check method for the distortion computation.

FIG. 23 shows a flow chart to realize a method for motion compensative operation which refers to an embodiment of this invention. FIG. 24 is a drawing for the explanation of an intermediate check method in the distortion quantity operation in this invention. FIG. 25 is a disposition drawing of a pixel sample at a sample point in a block in the intermediate check method for distortion operation in this invention.

Before the operation process, on the first block among M candidate blocks for search in the previous frame data, distortion quantity of all the pixels in the block shall be measured; the distortion quantity in this case is defined to be the minimum distortion. As for the distortion quantity, differential absolute value sum is adopted. In the distortion quantity operation about on and after the second block the calculation of differential absolute values of all pixels is not needed, but at an intermediate check point if the intermediate distortion quantity exceeds a certain value, it is judged that the ultimate distortion quantity of the block cannot be smaller than the minimum distortion D and the distortion quantity operation for the remaining part is stopped.

A block which gives the minimum distortion is detected by the calculation of the degree of approximation between the patterns by using the difference and accumulation of pixels in the respective M blocks which are selected out of the present input frame and the previous input frame (M is a positive integer). The number of pixels used for the calculation of the degree of approximation is K at the maximum (K is an integer greater than or equal to one and smaller than or equal to the number of a total number of pixels in one block). During the calculation of the degree of approximation at the time when the number of pixels in reference is less than K intermediate checks are performed four times, and an intermediate check point shall be provided in each $\frac{1}{4}$ sample point. FIG. 25 shows examples of sample points used for distortion quantity operation. The mark ◯ expresses a first time sample point for distortion quantity operation; the mark x expresses a second time sample point for distortion quantity operation; the mark △ expresses a third time sample point for distortion quantity operation; the mark ⊙ expresses a fourth time sample point for distortion quantity operation.

In FIG. 24 when the total number of sample points is assumed to be K, express threshold levels at a first, second and third intermediate check points as d1', d2' and d3'; then put $$d1' = D/4 + th1 \tag{9-1}$$

$$d2' = D/2 + th2 \tag{9-2}$$

$$d3' = 3D/4 + th3 \tag{9-3}$$

where th1, th2, th3 can be set independently. Express the distortion quantity at the first, second and third intermediate points as di1, di2 and di3.

In this case, di1 expresses the value of the first time distortion quantity in FIG. 25; di2 expresses a cumulative value, di1 plus the second time distortion quantity; di3 expresses a cumulative value, di2 plus the third time distortion quantity. Therefore, the cumulative value in which the fourth time distortion quantity is accumulated becomes the distortion quantity in which all sample points are included.

On the basis of a distortion quantity judgment at an intermediate check point if a block is estimated to have a large distortion quantity, the checking of the block is canceled before the block reaches the last check point to save useless operation processes. In other words if a distortion quantity di1 which is obtained by a distortion calculation at $\frac{1}{4}$ K sample point in a step ST41 is found to be di1>d1' by the judgment in the next step ST42, the block is canceled, if not, the operation is continued to the next step ST43 and the operation of distortion quantity di2 is performed with the distortion calculation at $\frac{1}{2}$ K sample point. If it is found that di2>d2' in the judgment in the next step ST44 the block is canceled and if not, the operation is continued into the step ST45. The operation of distortion quantity di3 is performed with the calculation at $\frac{3}{4}$ K sample point, and if it is found that di3>d3' by the judgment in the next step ST46 this block is canceled, if not, the operation is continued into the step ST47 and the distortion quantity di at K sample point is calculated for performing comparison and renewal.

As shown in the above if the processing is performed till the last step the same result is obtained as that obtained with the conventional method in which all the pixels are used for a distortion operation. If the distortion quantity di, in this case, is smaller than the minimum distortion D, the value of the minimum distortion D is renewed for di and the motion vector index is renewed for the index i. The /final minimum value of distortion D and the vector index I which shows the movement to give D can be obtained by repeating such operating processes as mentioned above by the number of times corresponding to the number of searching vectors till the process proceeds up to the Mth block.

In the above embodiment, differential absolute value sum is used for distortion quantity operation, but differential square value sum can also be used.

In the above embodiment, explanation is made about the case of motion compensative operation, but the execution of inner product vector quantization operation is also possible and the same effect can be obtained. When an operation result is compared with a threshold value at an intermediate check point, the relation in magnitude is opposite to what is mentioned in the above embodiment.

What is claimed is:

1. A digital signal processing apparatus comprising memory means which stores digital signal input information which is to be processed and reads out the stored information; a task controller which determines the total quantity of valid information which is contained in the digital information to be processed and produces address control signals for dividing the information to be processed into a plurality of assigned divisions so that each of said plurality of assigned divisions contains substantially the same individual quantity of valid information out of said total quantity of valid information; and a plurality of digital signal processors which receive and are responsive to said address control signals from said task controller to adjust the addresses of said assigned divisions of said information which is to be processed so that each of said assigned divisions is directed to a separate one of said digital signal processors, which read information out of said memory means to implement coding processes, and which output the results of the digital signal processes performed thereby.

2. A digital signal processing apparatus according to claim 1, wherein said memory means comprises a plurality of input memories provided in correspondence to said digital signal processors.

* * * * *

UNITED STATES PATENT AND TRADEMARK OFFICE
CERTIFICATE OF CORRECTION

PATENT NO. : 5,155,852

DATED : October 13, 1992

INVENTOR(S) : Tokumichi Murakami et al.

It is certified that error appears in the above-identified patent and that said Letters Patent is hereby corrected as shown below:

```
Column 2, line 2, "module" should be --modules--;
          line 40, delete "the".

Column 3, line 21, "outfitted" should be --outputted--;
          line 35, delete "as".

Column 6, line 58, delete "for";
          line 64, after "46" insert --is--.

Column 9, line 4, delete "block";
          line 64, "therefore" should be --thereof--.

Column 10, line 67, delete "of".

Column 13, line 53, "processors" should be
   --processor--.

Column 14, line 20, delete "parallel-";
           line 21, delete "ness".

Column 15, line 54, after "in" delete the comma ",".

Column 16, line 5, "381" should be --318--;
           line 59, "elements" should be --element--.

Column 18, line 49, ",address" should be --address--.

Column 20, line 68, after "the" delete the comma ",".
```

UNITED STATES PATENT AND TRADEMARK OFFICE
CERTIFICATE OF CORRECTION

PATENT NO. : 5,155,852

DATED : October 13, 1992

INVENTOR(S) : Tokumichi Murakami et al.

It is certified that error appears in the above-identified patent and that said Letters Patent is hereby corrected as shown below:

Column 22, line 13, "points" should be --point--;
          line 45, "¼" should be --½--;
          line 62, after "The" delete ". /".

Signed and Sealed this

Sixteenth Day of November, 1993

BRUCE LEHMAN

*Attesting Officer*    *Commissioner of Patents and Trademarks*